US012143957B2

United States Patent
Zorgui et al.

(10) Patent No.: US 12,143,957 B2
(45) Date of Patent: Nov. 12, 2024

(54) INDEPENDENT Tx AND Rx TIMING-BASED PROCESSING FOR POSITIONING AND SENSING

(71) Applicant: QUALCOMM Incorporated, San Diego, CA (US)

(72) Inventors: Marwen Zorgui, San Diego, CA (US); Srinivas Yerramalli, San Diego, CA (US); Xiaoxia Zhang, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 18/050,012

(22) Filed: Oct. 26, 2022

(65) Prior Publication Data
US 2024/0147399 A1 May 2, 2024

(51) Int. Cl.
*H04W 56/00* (2009.01)
*H04J 3/06* (2006.01)

(52) U.S. Cl.
CPC ......... *H04W 56/009* (2013.01); *H04J 3/0682* (2013.01); *H04W 56/006* (2013.01)

(58) Field of Classification Search
CPC ........... H04W 56/0055; H04W 56/006; H04W 56/0065; H04W 56/009; H04J 3/0635; H04J 3/0682; H04J 3/0685
See application file for complete search history.

(56) References Cited

U.S. PATENT DOCUMENTS

| | | | |
|---|---|---|---|
| 9,191,908 B2 * | 11/2015 | Aldana | H04W 56/0035 |
| 11,329,746 B2 * | 5/2022 | Dwivedi | H04J 3/0667 |
| 11,546,103 B2 * | 1/2023 | Akkarakaran | H04L 5/0094 |
| 2010/0135178 A1 * | 6/2010 | Aggarwal | H04W 24/00 370/252 |
| 2013/0223261 A1 * | 8/2013 | Aggarwal | G01S 5/10 370/252 |

(Continued)

FOREIGN PATENT DOCUMENTS

WO  WO-2022157598 A1 *  7/2022  ............ H04J 3/0661

OTHER PUBLICATIONS

International Search Report and Written Opinion—PCT/US2023/032944—ISA/EPO—Jan. 17, 2024.

(Continued)

*Primary Examiner* — Kevin D Mew
(74) *Attorney, Agent, or Firm* — Procopio, Cory, Hargreaves & Savitch LLP/Qualcomm

(57) ABSTRACT

Aspects presented herein may enable a network entity to calculate a relative clock drift between a Tx antenna panel and an Rx antenna panel that use different RF hardware/circuits (e.g., clocks). In one aspect, a network entity obtains a plurality of RTT measurements between a Tx antenna panel, a device with a known position, and an Rx antenna panel over a period of time, where the Tx antenna panel is associated with a first clock and the Rx antenna panel is associated with a second clock. The network entity obtains a first timing delay associated with the device based on the plurality of RTT measurements. The network entity calculates a clock offset between the Tx antenna panel and the Rx antenna panel based on the obtained first timing delay associated with the device.

30 Claims, 12 Drawing Sheets

(56) References Cited

U.S. PATENT DOCUMENTS

| | | | | |
|---|---|---|---|---|
| 2014/0254511 A1* | 9/2014 | Aldana | ............ | H04W 56/0035 |
| | | | | 370/329 |
| 2014/0334401 A1* | 11/2014 | Zhang | .................. | H04W 64/00 |
| | | | | 370/329 |
| 2019/0159161 A1* | 5/2019 | Kakani | ..................... | G01S 5/08 |
| 2020/0127784 A1* | 4/2020 | Akkarakaran | ...... | H04W 72/044 |
| 2020/0229124 A1* | 7/2020 | Soriaga | ............... | H04L 43/0864 |
| 2021/0352605 A1 | 11/2021 | Manolakos et al. | | |
| 2022/0295433 A1* | 9/2022 | Ma | ..................... | H04W 56/005 |

OTHER PUBLICATIONS

Qualcomm Incorporated: "Enhancements on Timing Error Mitigations for Improved Accuracy", 3GPP TSG RAN WG1 #104-e, R1-2101468, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, pp. 1-12, Jan. 19, 2021, XP051971633, Section 3.2 "Double Differential Positioning Methods—Elimination of both UE's and gNB unknow GDs", see also figure on p. 7, p. 6-9.

\* cited by examiner

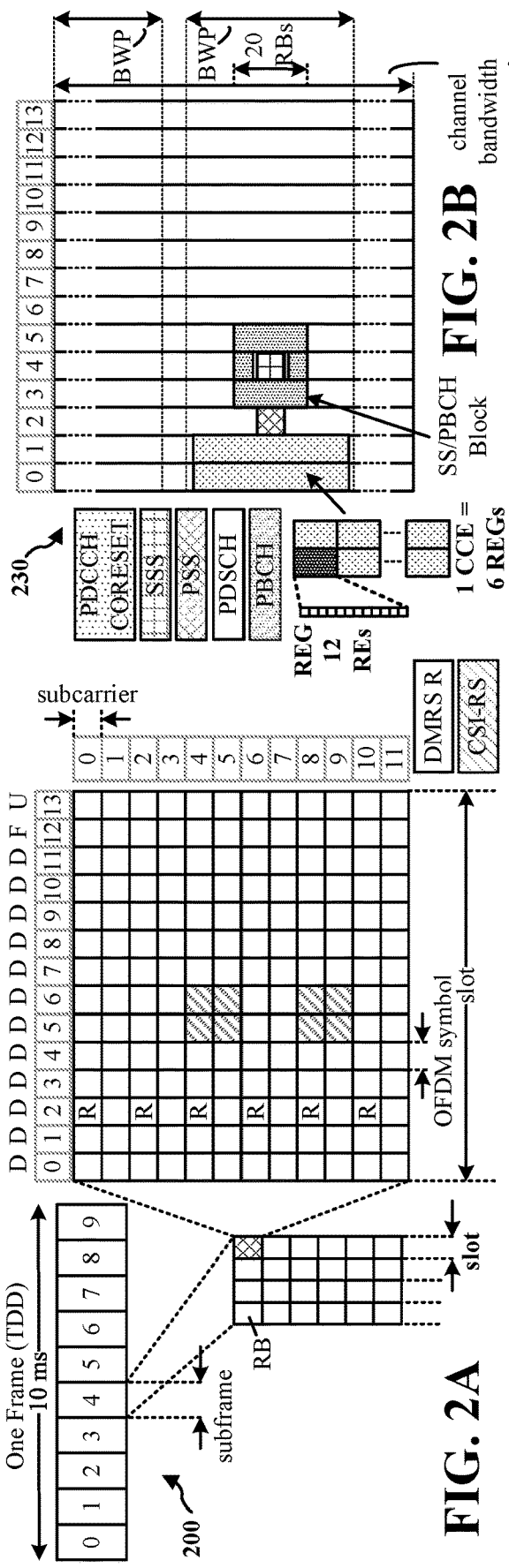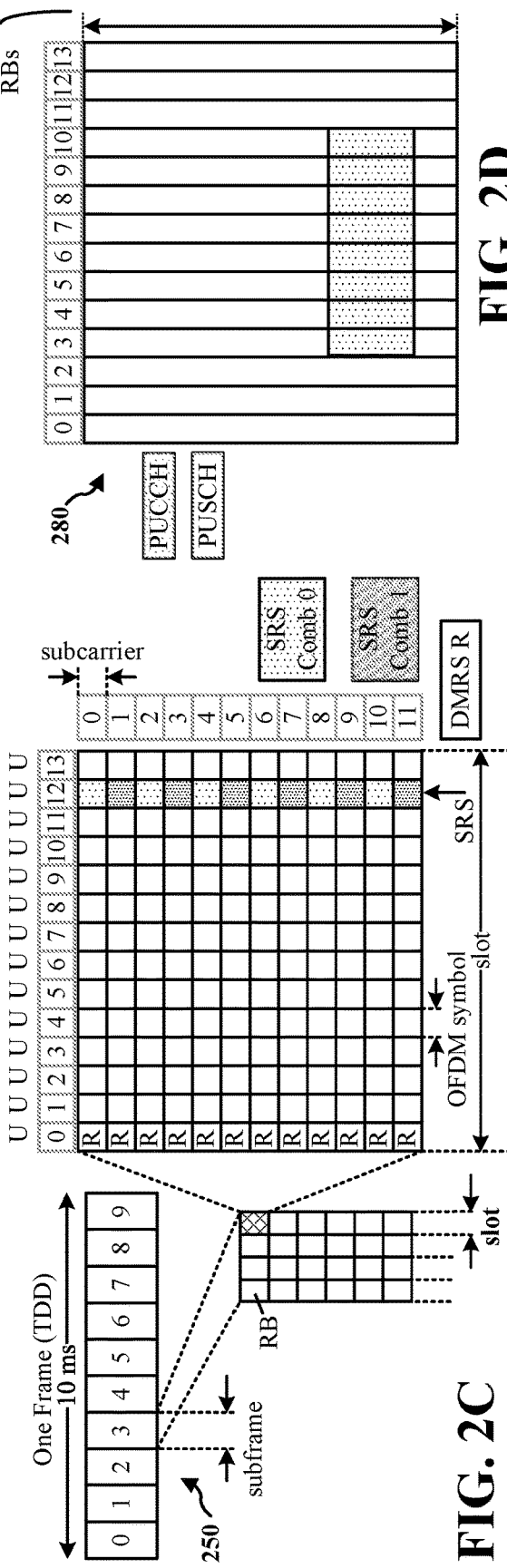

US 12,143,957 B2

INDEPENDENT Tx AND Rx TIMING-BASED PROCESSING FOR POSITIONING AND SENSING

TECHNICAL FIELD

The present disclosure relates generally to communication systems, and more particularly, to a wireless communication involving ranging and positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus obtains a plurality of round-trip time (RTT) measurements between a transmission (Tx) antenna panel, a device with a known position, and a reception (Rx) panel over a period of time, where the Tx antenna panel is associated with a first clock and the Rx antenna panel is associated with a second clock. The apparatus obtains a first timing delay associated with the device based on the plurality of RTT measurements. The apparatus calculates a clock offset between the Tx antenna panel and the Rx antenna panel based on the obtained first timing delay associated with the device.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
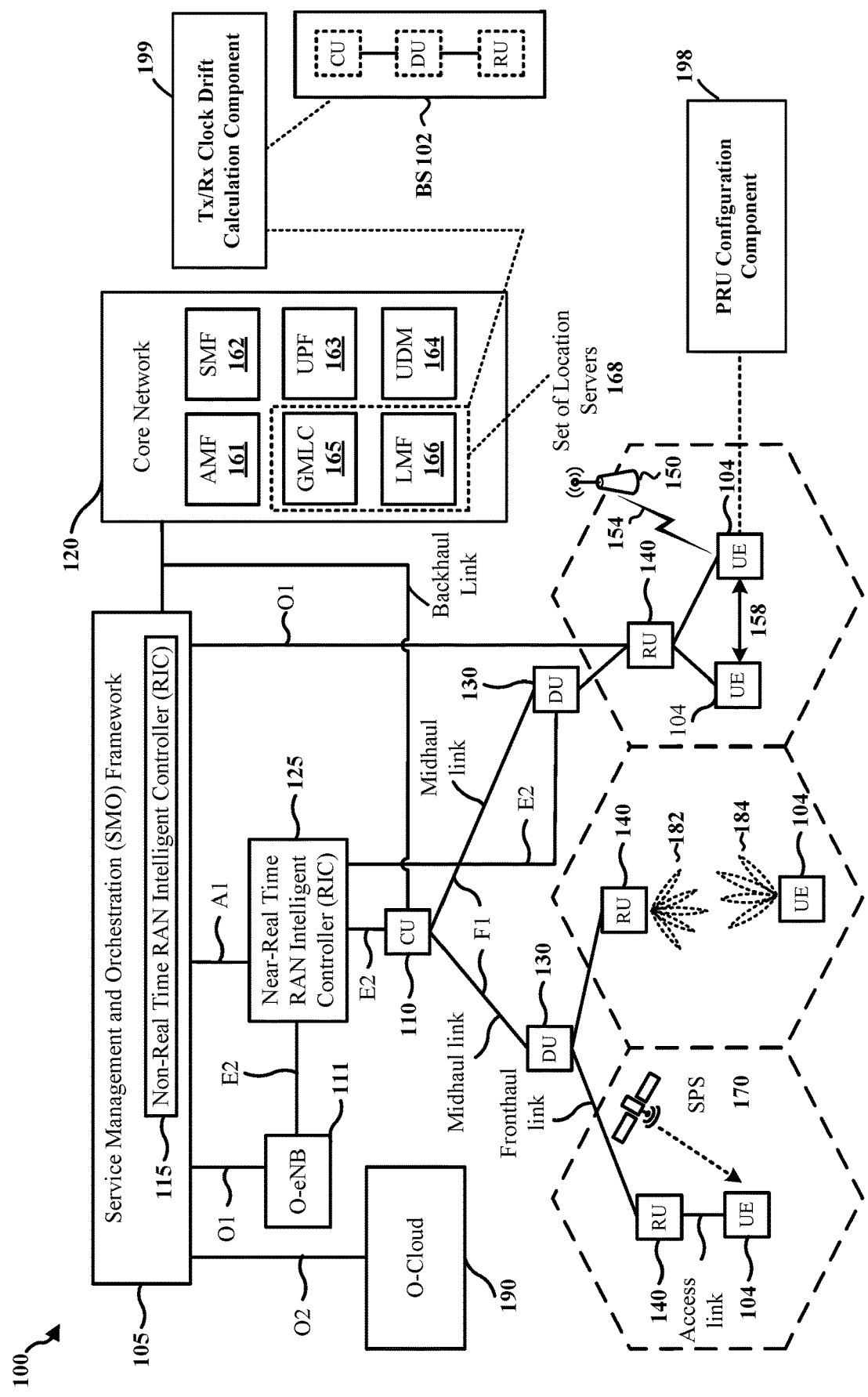
FIG. 1 is a diagram illustrating an example of a wireless communications system and an access network.

As different radio frequency (RF) hardware (e.g., different clocks, oscillators, timing circuitries, etc.) may be associated with different errors and delays, aspects presented herein may enable a wireless device (or a positioning entity) that is configured to use different RF hardware/circuits for signal transmission and signal reception to calculate (or to account for) a relative clock drift between the transmission (Tx) hardware/circuit and the reception (Rx) hardware/circuit. For example, while a relative clock drift may not have a significant impact on data communications if the relative clock drift is not extremely large, the relative clock drift may affect the accuracy of UE positioning. For example, an error as small as 100 nanoseconds may result in a localization error of 30 meters. As such, aspects presented herein may improve the accuracy of positioning, and may be applicable to a wireless device that is performing positioning using different RF hardware for Tx and Rx of signals, a wireless device that is performing a non-coherent monostatic sensing with Tx and Rx nearby but not the same entity, and/or a wireless device that is performing a bistatic sensing, etc.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RA configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 102 may be configured to obtain a plurality of round-trip time (RTT) measurements between a transmission (Tx) antenna panel, a device with a known position, and a reception (Rx) panel over a period of time, where the Tx antenna panel is associated with a first clock and the Rx antenna panel is associated with a second clock; obtain a first timing delay associated with the device based on the plurality of RTT measurements; and calculate a clock offset between the Tx antenna panel and the Rx antenna panel based on the obtained first timing delay associated with the device (e.g., via the Tx/Rx clock drift calculation component 199).

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
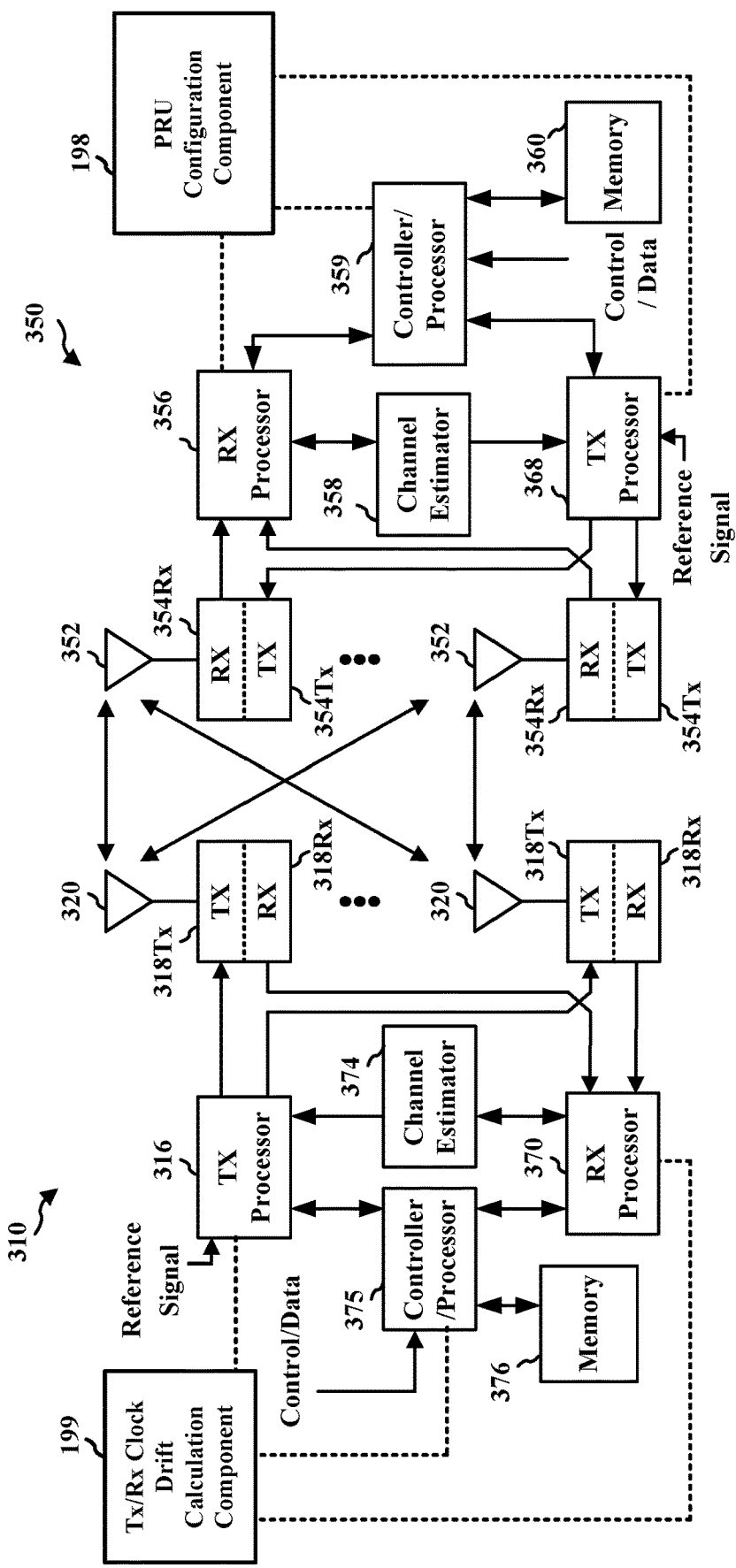
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the PRU component 198 of FIG. 1.

At least one of the TX processor 316, the RX processor 370, and the controller/processor 375 may be configured to perform aspects in connection with the Tx/Rx clock drift calculation component 199 of FIG. 1.

Figure 4:
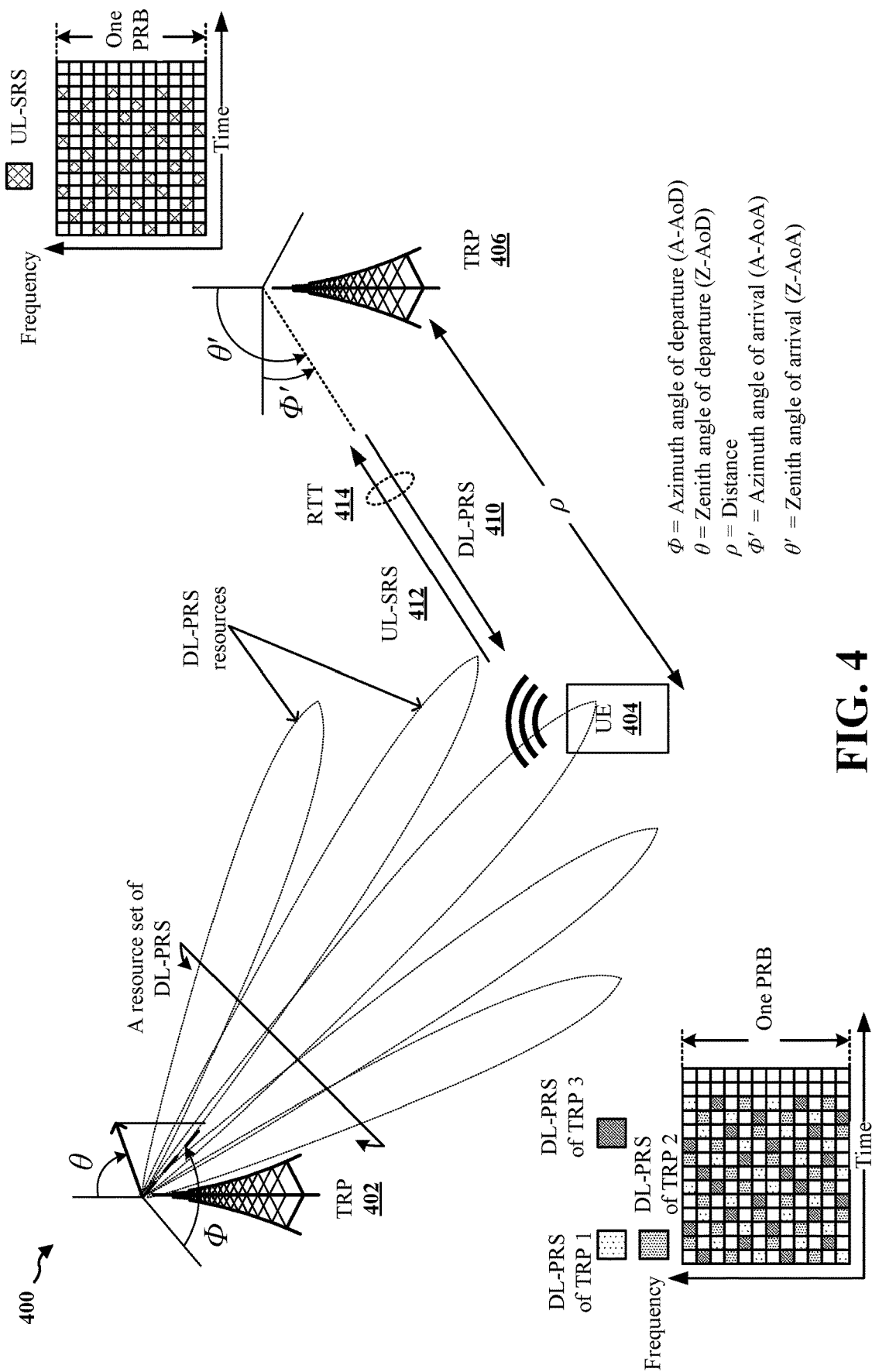
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX} - T_{PRS\_TX}\| - |T_{SRS\_TX} - T_{PRS\_RX}\|$. Accordingly, multi-RTT positioning may make use of the UE Rx-Tx time difference measurements (i.e., $|T_{SRS\_TX} - T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX} - T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information. For example, some UE positioning mechanisms may be radio access technology (RAT)-dependent (e.g., the positioning of a UE is based on a RAT), such as the downlink positioning (e.g., measuring of observed time difference of arrival (OTDOA), the uplink positioning (e.g., measuring of uplink time difference of arrival (UTDOA), and/or the combined DL and UL based positioning (e.g., measuring of RTT with respect to neighboring cells), etc. Some wireless communications systems may also support Enhanced Cell-ID (E-CID) positioning procedures that are based on radio resource management (RRM) measurements. On the other hand, some UE positioning mechanisms may be RAT-independent (e.g., the positioning of a UE does not rely on a RAT), such as the enhanced GNSS, and/or positioning technologies based on WLAN, Bluetooth, Terrestrial Beason System (TBS), and/or sensor based (e.g., barometric sensor, motion sensor), etc. Some UE positioning mechanisms may be based on a hybrid model, where multiple methods for positioning are used, which may include both RAT-dependent positioning technology and RAT-independent positioning technology (e.g., a GNSS with OTDOA hybrid positioning).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

In some examples, physical and/or electrical constraints in a wireless device, such as a UE, a base station, or a TRP, may include timing errors associated with the transmission and/or reception of a reference signal. For example, when a wireless device transmits a signal (hereafter the "transmitting device"), there may be a time delay from the time when a digital/RF signal is generated at its baseband (BB) to the time the generated digital/radio frequency (RF) signal is transmitted from its transmission/transmitting (Tx) antenna. To support positioning, a wireless device, such as a UE or a TRP, may implement an internal calibration/compensation of the Tx time delay for the transmission of the positioning reference signals (e.g., DL PRS, UL SRS, etc.), which may also include the calibration/compensation of the relative time delay between different RF chains in the same TRP and/or UE. The compensation may also possibly consider the offset of the Tx antenna phase center to the physical antenna center. However, as the calibration may not be perfect, the remaining Tx time delay after the calibration, or the uncalibrated Tx time delay may be defined as a "Tx timing error."

Similarly, when a wireless device receives a signal (hereafter the "receiving device"), from a signal reception perspective, there may be a time delay from the time when a digital/RF signal arrives at the reception/receiving (Rx) antenna of the receiving device to the time the digital/RF signal is digitized and time-stamped at its baseband. To support the positioning, a wireless device, such as a UE or a TRP, may implement an internal calibration/compensation of the Rx time delay before it reports the measurements that are obtained from the positioning reference signals (e.g., DL PRS, UL SRS, etc.), which may also include the calibration/compensation of the relative time delay between different RF chains in the same TRP and/or UE. The compensation may also possibly consider the offset of the Rx antenna phase center to the physical antenna center. However, as the calibration may not be perfect, the remaining Rx time delay after the calibration, or the uncalibrated Rx time delay may be defined as an "Rx timing error."

Figure 5:
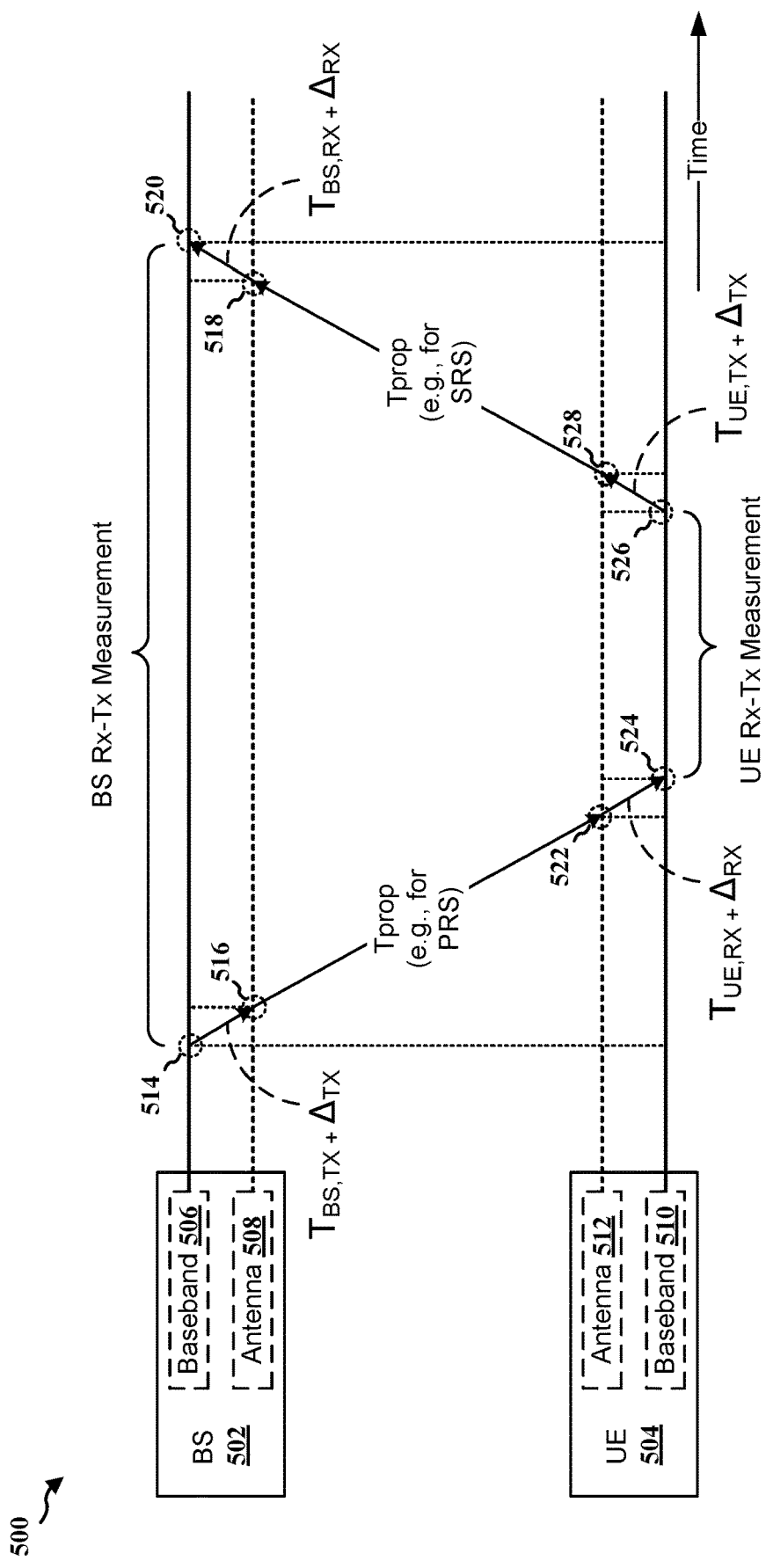
FIG. 5 is a diagram illustrating an example of time delay for transmitting and receiving a signal associated with a multi-round trip time (multi-RTT) positioning in accordance with various aspects of the present disclosure.

FIG. 5 is a diagram 500 illustrating an example of time delay for transmitting and receiving a signal associated with a multi-RTT positioning in accordance with various aspects of the present disclosure. A base station 502 (or a TRP) may include a baseband 506 and an antenna 508 (or a set of antennas). When the base station 502 transmits a signal (e.g., a PRS) to a UE 504, there may be a time delay from the time when the signal is generated at the baseband 506 (e.g., as shown at 514) to the time when the signal is transmitted from the antenna 508 (e.g., as shown at 516). When the base station 502 receives a signal (e.g., an SRS) transmitted from the UE 504, there may be a time delay from the time when the signal arrives at the antenna 508 (e.g., as shown at 518) to the time when the signal is digitized and time-stamped at the baseband 506 (e.g., as shown at 520). Similarly, the UE 504 may include a baseband 510 and an antenna 512. When the UE 504 receives a signal (e.g., a PRS) transmitted from the base station 502, there may be a time delay from the time when the signal arrives at the antenna 512 (e.g., as shown at 522) to the time when the signal is digitized and time-stamped at the baseband 510 (e.g., as shown at 524). When the UE 504 transmits a signal (e.g., an SRS) to the base station 502, there may be a time delay from the time when the signal is generated at the baseband 510 (e.g., as shown at 526) to the time when the signal is transmitted from the antenna 512 (e.g., as shown at 528). In some examples, the time delay(s) between the baseband and the antenna may cause the base station 502 and/or the UE 504's Rx-Tx measurements between transmitted signals and received signals to be inaccurate, which may reduce the accuracy of the positioning. While the timing delay may be compensated/calibrated, the compensation/calibration may not be perfect and may result in Rx timing error and/or Tx timing error. In some examples, an Rx timing error, a Tx timing error, or a combination of both the Rx timing error and Tx timing error as small as 100 nanoseconds may result in a localization error of 30 meters. For purposes of the present disclosure, an RTT or RTT measurement may refer to a duration it takes for a first wireless device to transmit a signal (e.g., PRS/SRS) to a second wireless device and to receive a signal (e.g., SRS/PRS) from the second wireless device. For example, an RTT measurement may include a two-way messaging technique (e.g., a base station/TRP to a UE and the UE to the base station/TRP), with both the UE and the base station/TRP reporting their receive-to-transmit (Rx-Tx) time differences to a positioning entity, such as a location server or an LMF, that computes the UE's position. This allows for computing the back-and-forth flight time between the UE and the base station/TRP, and the distance between the UE and the base station/TRP may also be determined based on the flight time.

Figure 6:
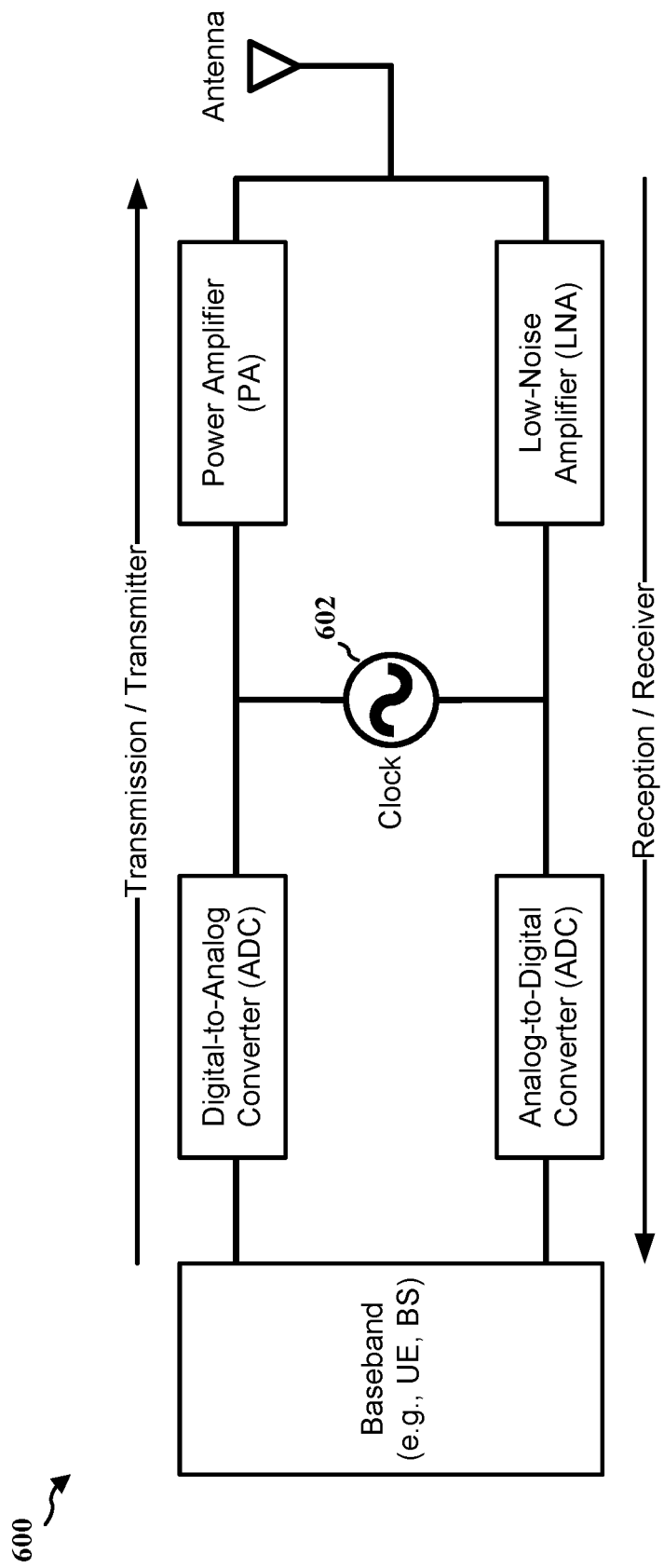
FIG. 6 is a diagram illustrating an example of transmission (Tx)/reception (Rx) (Tx/Rx) signal processing at a wireless device in accordance with various aspects of the present disclosure.

FIG. 6 is a diagram 600 illustrating an example of transmission/reception signal processing at a wireless device in accordance with various aspects of the present disclosure.

When a wireless device transmits a digital signal generated from its baseband, the wireless device may first convert the digital signal to an analog signal via a digital-to-analog (ADC) converter, amplify the analog signal with a power amplifier (PA), and then transmit the amplified analog signal via its antenna (e.g., as performed at 514 to 516 and/or 526 to 528 of FIG. 5). Conversely, when the wireless device receives an analog signal at its antenna, the wireless device may first amplify the received analog signal with a low-noise amplifier (LNA), convert the amplified analog signal to a digital signal via an analog-to-digital converter (ADC), and transmit the digital signal to its baseband for processing (e.g., as performed at 518 to 520 and/or 522 to 524 of FIG. 5).

As shown at 602 of FIG. 6, for network-based positioning, such as the multi-RTT positioning described in connection with FIGS. 4 and 5, there may be an inherent assumption/configuration that the transmitter and the receiver at a given network/positioning node (e.g., at a UE or TRP) are driven by the same clock. Such assumption/configuration may enable both the transmitting device and the receiving device (e.g., the TRP and the UE) to make consistent measurements of Rx-Tx time and thus enable them to perform the RTT measurements/positioning. However, in some scenarios, a wireless device or a network entity may be configured to use different/separate RF hardware for signal transmission and signal reception.

Figure 7:
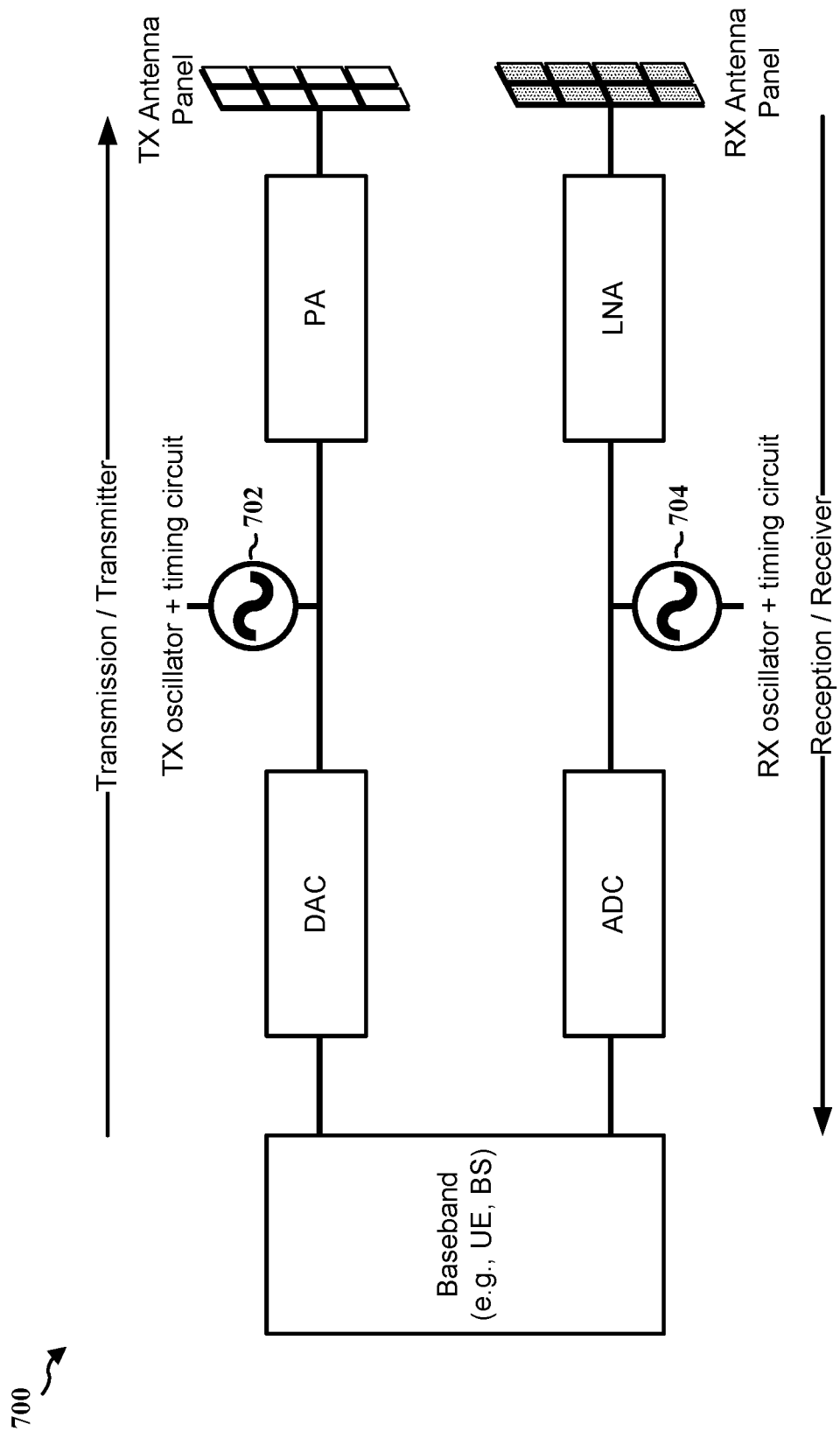
FIG. 7 is a diagram illustrating an example of a wireless device transmitting and receiving signals using different/separate radio frequency (RF) hardware in accordance with various aspects of the present disclosure.

FIG. 7 is a diagram 700 illustrating an example of a wireless device transmitting and receiving signals using different/separate RF hardware in accordance with various aspects of the present disclosure. As shown by the diagram 700, in some scenarios, a wireless device may use different clocks for signal transmission and signal reception. For example, as shown at 702, the wireless device may use a first clock (e.g., a Tx/RF oscillator with a timing circuit) for signal transmission, and as shown at 704, the wireless device may use a second clock (e.g., an Rx/RF oscillator with a timing circuit) for signal reception.

One example scenario where a wireless device may use different RF hardware (e.g., different RF oscillators and timing circuits) for transmission and reception of signals may be performing a full-duplex operation (or a sub-band full duplex operation), where the wireless device may be configured to transmit signals and receive signals at the same time (e.g., simultaneously). In other words, a full-duplex operation (or sub-band full duplex operation) may specify a wireless device to use separate antenna panels (with some IC) to isolate the transmission and reception of signals.

Another example scenario where a wireless device may use different RF hardware for Tx and Rx of signals may be performing a bistatic sensing (or a bistatic RF sensing) where transmission of signals and reception of signals are associated with different units/entities (e.g., the transmitter and the receiver may be at different locations). In addition to network-based UE positioning technologies, a wireless device (e.g., a base station, a component of the base station, a UE, etc.) may also be configured to include radar capabilities, which may be referred to as the "RF sensing" and/or the "cellular-based RF sensing." For example, a wireless device may transmit radar reference signals (RRSs) and measure the RRSs reflected from one or more objects. Based at least in part on the measurement, the wireless device may determine or estimate a distance between the wireless device and the one or more objects. For purposes of the present disclosure, a device that is capable of performing RF sensing (e.g., transmitting and/or receiving RRS for detecting an object or for estimating the distance between the device and the object) may be referred to as an "RF sensing node." For example, an RF sensing node may be a UE, a base station, a component of the base station, a TRP, a device capable of transmitting RRS, and/or a device configured to perform radar functions, etc. In some implantations, RF sensing may be categorized in two types of RF sensing mode: a mono-static sensing mode and a bistatic/multi-static sensing mode (which may also be referred to as "mono-static RF sensing" and "bistatic RF sensing" respectively). Under the mono-static sensing, the transmitter (e.g., the Tx antenna panel) and the receiver (e.g., the Rx antenna panel) of the RF sensor are co-located, such as in the same wireless device (e.g., a base station, a component of a base station, a UE, a component of a UE, etc.). Thus, the transmission and reception of the radar signals may be performed by one device. On the other hand, under the bistatic/multi-static sensing, the transmitter and receiver may be separated (e.g., on different wireless devices and/or locations). For example, the transmitter (e.g., the Tx antenna panel) of a first wireless device may transmit sensing signals, and the sensing signals or sensing signals reflected from one or more objects may be received by the receiver (e.g., the Rx antenna panel) of a second wireless device (e.g., a sensing base station, a sensing UE, etc.).

As different RF hardware (e.g., different clocks, oscillators, timing circuitries, etc.) may be associated with different errors and delays, aspects presented herein may enable a wireless device (or a positioning entity) that is configured to use different RF hardware/circuits for signal transmission and signal reception to calculate (or to account for) a relative clock drift between the Tx hardware/circuit and the Rx hardware/circuit. For example, while a relative clock drift may not have a significant impact on data communications if the relative clock drift is not extremely large, the relative clock drift may affect the accuracy of UE positioning. For example, as described in connection with FIG. 5, an error as small as 100 nanoseconds may result in a localization error of 30 meters. As such, aspects presented herein may improve the accuracy of positioning, and may be applicable to a wireless device that is performing positioning using different RF hardware for Tx and Rx of signals, a wireless device that is performing a non-coherent monostatic sensing with Tx and Rx nearby but not the same entity, and/or a wireless device that is performing a bistatic sensing, etc. Note that for DL-TDOA and/or UL-TDOA based positioning, it may be assumed that there is a common clock distribution to all the signal transmissions or all the signal receptions or both. Thus, the relative clock drift issue may not arise in such scenarios.

Figure 8:
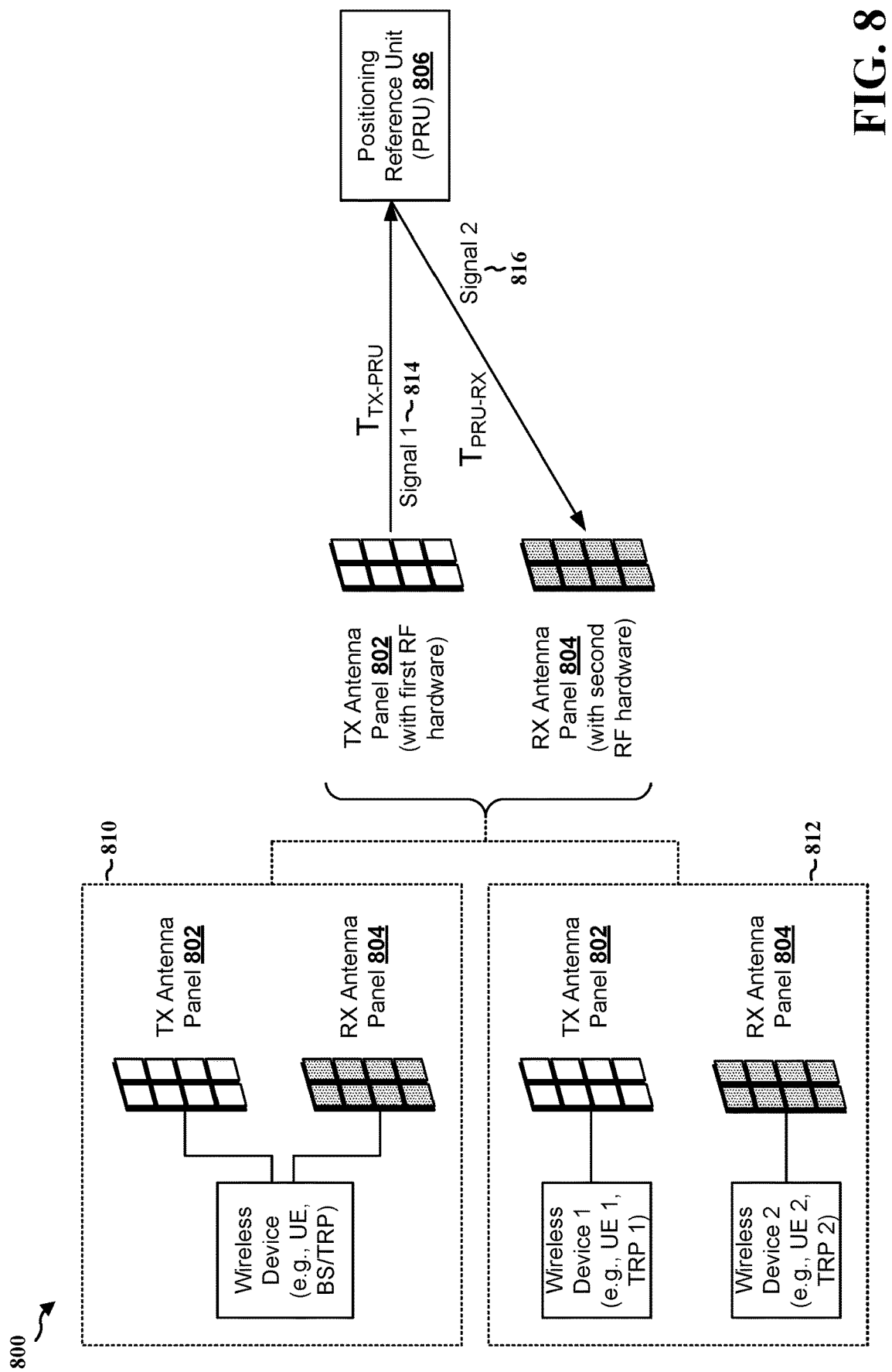
FIG. 8 is a diagram illustrating an example of calculating a relative clock drift between a Tx antenna panel and an Rx antenna panel that are associated with different RF hardware in accordance with various aspects of the present disclosure.

FIG. 8 is a diagram 800 illustrating an example of calculating a relative clock drift between a transmission/transmitting (Tx) antenna panel and a reception/receiving (Rx) antenna panel that are associated with different RF hardware in accordance with various aspects of the present disclosure. In one aspect of the present disclosure, a relative clock drift (which may be referred to as a "clock offset" or a "timing offset" hereafter) between a Tx antenna panel 802 that is associated with a first set of RF hardware (e.g., a Tx oscillator and a first timing circuit) and an Rx antenna panel 804 that is associated with a second set of RF hardware (e.g., an Rx oscillator and a second timing circuit) may be estimated using a positioning reference unit (PRU) 806. For purposes of the present disclosure, a PRU may refer to a UE or a stationary device with a known positioning and with a capability to transmit and receive signals. A PRU may also be configured to have a line-of-sight (LOS) with another wireless device such as a TRP. In one example, LOS may refer to a direct line/path between a first wireless device (e.g., a transmitting device) and a second wireless device (e.g., a receiving device), where the first wireless and the second wireless device may be in view of each other without an obstacle between them.

In some configurations, as shown at 810, the Tx antenna panel 802 and the Rx antenna panel 804 may be associated with the same wireless device (e.g., they may be co-located, such as on a full-duplex UE or TRP). In other configurations, as shown at 812, the Tx antenna panel 802 and the Rx antenna panel 804 may be associated with different/separate wireless devices, which may not be co-located with each other. For example, the Tx antenna panel 802 may be on a first TRP of a base station and the Rx antenna panel 804 may be on a second TRP of the base station. The first TRP and the second TRP may be a distance apart from each other. In another example, the Tx antenna panel 802 may be on a TRP of a first base station and the Rx antenna panel 804 may be on a TRP of a second base station. In another example, the Tx antenna panel 802 may be on a first UE and the Rx antenna panel 804 may be on a second UE, where the UEs may be at different locations.

In one aspect of the present disclosure, to estimate the clock offset between the Tx antenna panel 802 and the Rx antenna panel 804, as shown at 814, the Tx antenna panel 802 may transmit a first signal (e.g., a TX-PRU signal) to the PRU 806, where the time it takes for the first signal to travel/propagate (e.g., on the air) may be denoted by $T_{TX-PRU}$. In response to receiving the first signal, as shown at 816, the PRU 806 may transmit a second signal (e.g., a PRU-RX signal) to the Rx antenna panel 804, where the time it takes for the second signal to travel/propagate (e.g., on the air) may be denoted by $T_{PRU-RX}$. For purposes of the illustration, it may be assumed that the link/path from the Tx antenna panel 802 to the PRU 806 (e.g., as shown by 814) and the link/path from the PRU 806 to the Rx antenna panel 804 are LOS links/paths. It may also be assumed that the delays associated with the Tx antenna panel 802 and the Rx antenna panel 804 are known. In some examples, the delays may also be referred to as timing delays, time delays, antenna panel group delays, or simply group delays. For example, there may be a Tx time delay that is associated with the transmission of a signal by a node and an Rx time delay that is associated with the reception of a signal at a node. In the case of a PRU, the PRU is involved in both receiving a signal and transmitting another signal. Thus, the PRU may be associated with both Tx time delay and Rx time delay. However, to calculate the total delays at the PRU (e.g., the sum of Tx time delay and Rx time), this total delay may be referred to as one "group delay" or "timing delay" for purposes of the present disclosure. Similarly, the Tx antenna panel is involved with transmitting a signal, so its Tx time delay is involved (and may be known). The Rx antenna panel is involved with receiving a signal, so its Rx time delay is involved (and may be known). In addition, the term "Tx time delay," from a signal transmission perspective, may refer to the time delay from the time when the digital signal is generated at baseband to the time when the RF signal is transmitted from the Tx antenna. The term "Rx time delay," from a signal reception perspective, may refer to a time delay from the time when the RF signal arrives at the Rx antenna to the time when the signal is digitized and time-stamped at the baseband.

Based on the transmission and reception of the first signal and the second signal via the PRU 806, the round-trip time (RTT) for the first signal and the second signal may be measured/calculated based on:

$$RTT = T_{TX}^g + T_{TX-PRU} + T_{PRU}^g + T_{PRU-RX} + T_{RX}^g + T_{TX-RX-clkoffset},$$

where $T_{TX}^g$ is a timing delay associated with the Tx antenna panel 802, $T_{TX-PRU}$ is the time for the first signal to propagate from the Tx antenna panel 802 to the PRU 806, $T_{PRU}^g$ is the timing delay associated with the PRU 806 (hereafter "PRU timing delay"), $T_{PRU-RX}$ is the time for the second signal to propagate from the PRU 806 to the Rx antenna panel 804, $T_{RX}^g$ is a timing delay associated with the Rx antenna panel 804, and $T_{TX-RX-clkoffset}$ is the clock offset between the Tx antenna panel 802 and the Rx antenna panel 804. As discussed in connection with FIG. 5, the value of the RTT may be measured based on the total time it takes for the first signal to be generated at a baseband associated with the Tx antenna panel 802 and the second signal to be processed by a baseband associated with the Rx antenna panel 804. Also, the PRU timing delay ($T_{PRU}^g$) may include both a Tx delay and an Rx delay at the PRU 806 (e.g., a first delay associated with receiving the first signal and a second delay associated with transmitting the second signal, such as shown by FIG. 5). In some examples, the PRU timing delay may be calibrated using one or more mechanisms, while in other examples, the PRU timing delay may be a variable that is specified to be jointly estimated (discussed in details below).

As the Tx antenna panel 802, the Rx antenna panel 804, and the PRU 806 may be at fixed and known locations, the time for the first signal to propagate from the Tx antenna panel 802 to the PRU 806 (e.g., $T_{TX-PRU}$) and the time for the second signal to propagate from the PRU 806 to the Rx antenna panel 804 (e.g., $T_{PRU-RX}$) may be known quantities (e.g., calculated by dividing their distances with the speed of light). In addition, the timing delay associated with the Tx antenna panel 802 (e.g., $T_{TX}^g$) and the timing delay associated with the Rx antenna panel 804 (e.g., $T_{RX}^g$) may also be known quantities (e.g., obtained via calibration at the Tx antenna panel 802 and the Rx antenna panel 804). Since the value of the RTT is also known, these known quantities may be cancelled out from the measured RTT.

After cancelling out these known quantities from the RTT, an estimated timing ($\hat{T}_{est}$) that includes the rest quantities (e.g., the unknown timing delay associated with the PRU 806 ($T_{PRU}^g$) and the clock offset between the Tx antenna panel 802 and the Rx antenna panel 804 ($T_{TX-RX-clkoffset}$)) may be represented by:

$$\hat{T}_{est} = RTT - T_{TX}^g - T_{RX}^g - T_{TX-PRU} - T_{PRU-RX} = T_{PRU}^g + T_{TX-RX-clkoffset}.$$

If the PRU timing delay $T_{PRU}^g$ is known (e.g., via calibration at the PRU 806), then it may be cancelled from the measured RTT as well. Thus, the value of the clock offset ($T_{TX-RX-clkoffset}$) between the Tx antenna panel 802 and the Rx antenna panel 804 may be determined based on $\hat{T}_{est} - T_{PRU}^g = T_{TX-RX-clkoffset}$. However, in general, the value for this PRU timing delay is not known to wireless device(s) associated with the Tx antenna panel 802 and/or the Rx antenna panel 804.

In another aspect of the present disclosure, to separate the PRU timing delay from the clock offset, a statistical property of the clock offset may be utilized to determine the value of the PRU timing delay. For example, an expectation value or an average value of the clock offset may be assumed to be zero, e.g., $E[T_{TX-RX-clkoffset}] = 0$. As the PRU timing delay may be a constant value, after measuring the RTTs between the Tx antenna panel 802, the PRU 806, and the Rx antenna panel 804 for a number of times, the PRU timing delay may be obtained, e.g., PRU Group Delay=$E[\hat{T}_{est}]$=$T_{PRU}^g$. In other words, during a setup phase, the RTT procedure describe herein may be carried out by the wireless device(s) associated with the Tx antenna panel 802 and the Rx antenna panel 804 for multiple times with the same PRU (e.g., the PRU 806) over a period of time (e.g., several minutes, hours, etc.) to collect many realizations of $\hat{T}_{est}$, then the value of $T_{PRU}^g$ may be obtained based on the expectation or the average of these realizations ($E[\hat{T}_{est}]$), and the instantaneous clock offset ($T_{TX-RX-clkoffset}$) can be estimated once $T_{PRU}^g$ is known. In one example, a running average filter may be used by the wireless device(s) associated with the Tx antenna panel 802 and the Rx antenna panel 804 to keep updating the estimate of the PRU timing delay ($T_{PRU}^g$).

In another aspect of the present disclosure, wireless device(s) that use different RF hardware for signal transmission and reception (e.g., wireless device(s) that are associated with the Tx antenna panel 802 and the Rx antenna panel 804 as shown at 810 and 812) may be configured to transmit an indication to a location server (e.g., an LMF) indicating that it uses different RF hardware (e.g., clocks, oscillators, etc.) for signal transmission and reception. For example, as the UE/TRP discussed in connection with FIGS. 7 and 8 may have different Tx and Rx timing, a specific TRP/UE indication (e.g., a one-bit indication or a few-bit indication) may be configured for the TRP/UE to inform the location server, such as during a UE positioning session. As such, the location server may take such configuration or indication into consideration, and may request the TRP/UE to provide the clock offset between the Tx antenna panel and the Rx antenna panel to improve the positioning accuracy. The location server may also request the TRP/UE to provide measurements (e.g., RTT measurement) and known quantities (e.g., the timing delay at Tx/Rx antenna panels) to the location server, and the location server may calculate the clock offset instead, which may be suitable for UE-assisted positioning. On the other hand, if a TRP/UE does not provide such indication, the location server may assume the TRP/UE has the same TX and RX timing (e.g., as shown by FIG. 6). In addition, if the location server is not aware of the locations of the Tx antenna panel and/or the Rx antenna panel, the wireless device(s) associated with the Tx antenna panel and/or the Rx antenna panel may also indicate the locations of the Tx antenna panel and/or the Rx antenna panel to the location server, e.g., via a location indication. The locations of the TX and RX antenna panels may also be separately indicated to the location server, such as when they are not co-located with each other or when they are associated with different entities (e.g., TRPs from different base stations, different UEs, etc.). As such, the location server may use different algorithm(s) to process the RTT data (e.g., an algorithm that takes the clock offset between the TX and RX antenna panels into consideration).

In another aspect of the present disclosure, for a wireless device (e.g., a UE, a TRP, a base station, etc.) that uses different hardware for signal transmission and reception, the wireless device may indicate to a location server (e.g., an LMF) which device(s) (e.g., UE(s)) may be considered or used as a PRU (e.g., the PRU 806) for determining the clock offset and/or the timing delay(s). In response, the location server may select a device that can be used as a PRU for the wireless device, and the location server may configure the device (e.g., the selected PRU) for measurements (e.g., for determining the clock offset between the Tx antenna panel and the Rx antenna panel). In some examples, the location server may select a device to be used as a PRU based on the location of the device, such as the device is in LOS with both the Tx antenna panel and the Rx antenna panel.

Then, the location server may request a selected PRU to provide its PRU timing delay information/measurement (e.g., $T_{PRU}^g$). If such PRU timing delay information/measurement is available, the clock offset between the Tx antenna panel and the Rx antenna panel may be determined as described in connection with FIG. 8 (e.g., $\hat{T}_{est}$-$T_{PRU}^g$=$T_{TX-RX-clkoffset}$). On the other hand, if the PRU does not have the PRU timing delay information/measurement, the LMF may configure a positioning/measurement session for the wireless device and the PRU, where the wireless device may estimate the PRU timing delay of the PRU over a period of time based on the mechanisms described in connection with FIG. 8, e.g., collecting many realizations of $\hat{T}_{est}$ and determining $T_{PRU}^g$. After the PRU timing delay is available, the location server may use the wireless device for positioning. For example, if the timing delay at a PRU is known, then the instant clock offset between the Tx antenna panel and the Rx antenna panel of a TRP may be determined. As such, an LMF may select the TRP for positioning as it may provide a higher accuracy compared to another TRP (also using different RF hardware for signal transmission and reception) that is unable to determine its clock offset (e.g., its Tx/Rx antenna panel may not be in LOS with the PRU).

In another example, as shown at 812 of FIG. 8, aspects presented herein may apply to a bistatic sensing operation. For example, wireless device(s) (e.g., TRP(s), a UE(s), etc.) may start/initiate RF sensing with different Tx and Rx antenna panels if the timing delays at a PRU used by the wireless device(s) have been derived and instantaneous clock offset between different Tx and Rx antenna panels can be estimated.

In another aspect of the present disclosure, the mechanism of determining the clock offset between a Tx antenna panel and an Rx antenna panel that use different RF hardware may also apply to time difference of arrival (TDOA) operations (e.g., positioning of a UE based on TDOA measurements). TDOA is a method of UE positioning based on measurement of time difference, where the distance of a UE with respect to a TRP may be determined by measuring the time it takes for signal transmitted from the UE to arrive the TRP or vice versa. Then, the accurate location of the UE may be determined by finding its distance from three or more TRPs.

Figure 9:
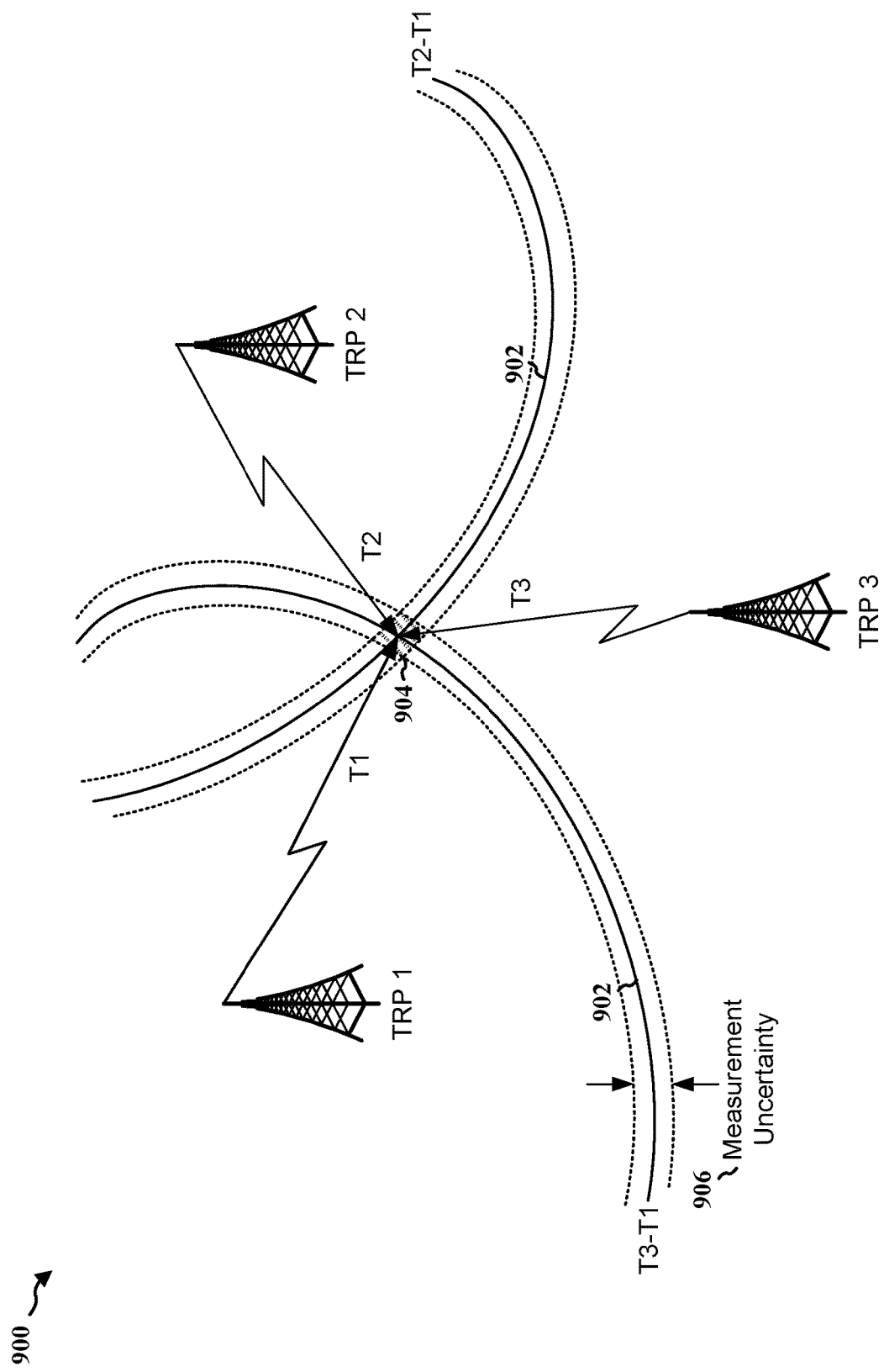
FIG. 9 is a diagram illustrating an example of a UE positioning based on observed time difference of arrival (OTDOA) in accordance with various aspects of the present disclosure.

FIG. 9 is a diagram 900 illustrating an example of a UE positioning based on observed time difference of arrival (OTDOA) in accordance with various aspects of the present disclosure. OTDOA uses multilateration in which a UE may measure the time of arrival (TOA) of signals received from multiple synchronized TRPs. The TOAs from several neighboring TRPs may be subtracted from the TOA of a reference TRP to form the OTDOA. In some scenarios, as shown at 902, geometrically, each TOA may determine a hyperbola, and the point at which the hyperbolas intersect, such as shown at 904, may be the UE location. In some examples, at least three timing measurements from geographically dispersed TRPs may be specified to determine two coordinates (latitude and longitude) of the UE. The performance and accuracy of the UE positioning may further be improved via incorporation of additional TRPs. In other words, multiple TDOA measurements may be used for triangulation (e.g., ≥4 TRPs/cells). For example, a UE may measure three TOAs relative to the UE internal time base, T1, T2, and T3. The measurement from a first TRP (TRP 1) may be selected as a reference, and two OTDOAs may be formed based on:

$T_{2,1}=T2-T1$ and $T_{3,1}=T3-T1$. As shown at 906, each TOA measurement T(i) may have a certain accuracy and uncertainty. As such, the hyperbolas (e.g., 902) in the diagram 900 may include a certain width that illustrates the measurement uncertainty. The estimated UE location may be the intersection area of each set of the two hyperbolas, such as shown at 904. The measurement made by the UE for OTDOA positioning may be the RSTD measurement. The RSTD is the relative timing difference between two TRPs: a reference TRP and a measured neighboring TRP. In some examples, as network synchronization may be an important aspect for a high precision positioning, the precision and accuracy of a UE positioning session may be reduced if TRPs are not properly synchronized.

As such, by enabling a location server (e.g., an LMF) to determine the clock offset between Tx/Rx antenna panels of different TRPs based on the mechanism described in connection with FIG. 8 (e.g., using a PRU that is in LOS with the TRPs), the accuracy of TDOA-based positioning may be improved. For example, referring back to FIG. 9, the clock offset between a Tx antenna panel of the first TRP and the Rx antenna panel of the second TRP may be estimated (e.g., by the location server). Then, if each TRP has the same clock for Tx and Rx, every pair of TRPs or all TRPs used for the TDOA-based positioning may be synchronized as their instant clock offsets may be determined via using a PRU (or multiple PRUs). Once the clock offsets between TRPs are known, the location server may start the TDOA-based positioning session. As such, the PRU Tx-Rx clock offset calibration procedure described herein may apply to the beginning of a TDOA-based positioning session. In some examples, the location server may be configured to assume that the clock offset calibration is to hold through the TDOA-based positioning session once it is calibrated.

Figure 10:
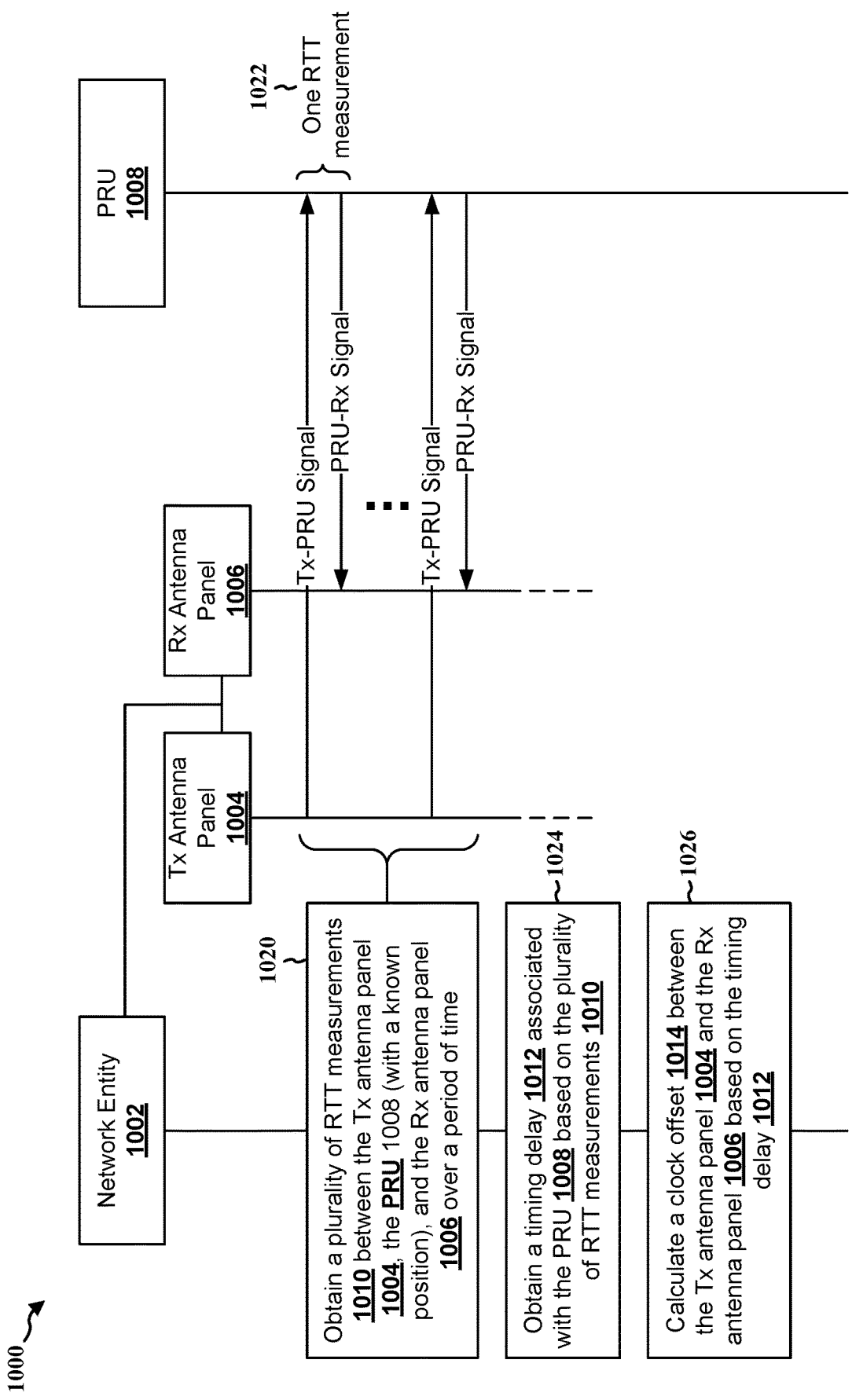
FIG. 10 is a communication flow illustrating an example of a network entity that uses different RF hardware/circuits or TRPs for signal transmission and signal reception to calculate a relative clock offset/drift between the Tx hardware/circuit and the Rx hardware/circuit in accordance with various aspects of the present disclosure.

FIG. 10 is a communication flow 1000 illustrating an example of a network entity (e.g., a base station, a component of the base station, a TRP, a location server, or an LMF, etc.) that uses different RF hardware/circuits or TRPs for signal transmission and signal reception to calculate a relative clock offset/drift between the Tx hardware/circuit and the Rx hardware/circuit in accordance with various aspects of the present disclosure. The numberings associated with the communication flow 1000 do not specify a particular temporal order and are merely used as references for the communication flow 1000.

In one example, a network entity 1002 may be associated with a Tx antenna panel 1004 and an Rx antenna panel 1006. The Tx antenna panel 1004 may be associated with a first set of RF hardware/circuits (e.g., a first clock), and the Rx antenna panel 1006 may be associated with a second set of RF hardware/circuits (e.g., a second clock that is different from the first clock). In some examples, as shown at 810 of FIG. 8, the Tx antenna panel 1004 and the Rx antenna panel 1006 may be associated with or located at one entity/device, such as on a UE, a base station, a TRP, etc.). In other examples, as shown at 812 of FIG. 8, the Tx antenna panel 1004 and the Rx antenna panel 1006 may be associated with different entities, such as on different UEs, base stations, TRPs, etc.). As described in connection with FIG. 8, the network entity 1002 may determine a clock offset (or clock drift) between the Tx antenna panel 1004 and the Rx antenna panel 1006 with the assistance of using a PRU 1008, which may be a UE with a known location. If the Tx antenna panel 1004 and the Rx antenna panel 1006 are at different locations and the network entity 1002 is unaware of their locations, the Tx antenna panel 1004 and the Rx antenna panel 1006 may indicate their locations to the network entity 1002 (via one indication or separate indications via their associated entity/entities).

For example, at 1020, the network entity 1002 may obtain a plurality of RTT measurements 1010 between the Tx antenna panel 1004, the PRU 1008, and the Rx antenna panel 1006 over a period of time (e.g., to collect many sets of RTT measurements). As shown at 1022, each RTT measurement may include a time where a signal (e.g., a Tx-PRU signal) is generated at the baseband of the Tx antenna panel 1004 to the time where a signal (e.g., a PRU-Rx signal) is received by the baseband of the Rx antenna panel 1006, such as described in connection with FIG. 5.

At 1024, the network entity 1002 may obtain a timing delay 1012 associated with the PRU 1008 (e.g., the PRU timing delay) based on the plurality of RTT measurements 1010, such as described in connection with FIG. 8.

At 1026, the network entity 1002 may calculate a clock offset 1014 between the Tx antenna panel 1004 and the Rx antenna panel 1006 based on the timing delay 1012 associated with the PRU 1008, such as described in connection with FIG. 8.

In one example, the network entity 1002 may receive a list of PRU candidates with known locations that are capable of determining their corresponding timing delays, and the network entity 1002 may select one PRU (e.g., the PRU 1008) from the list of PRU candidates based on at least one criterion. For example, the at least one criterion may include the PRU being in a LOS condition with the Tx antenna panel 1004 and the Rx antenna panel 1006.

In another example, to obtain the timing delay 1012, the network entity 1002 may configure the PRU for a measurement of the timing delay 1012, and the network entity 1002 may receive the timing delay 1012 from the PRU 1008.

In another example, a first TRP may be associated with the Tx antenna panel 1004 and a second TRP may be associated with the Rx antenna panel 1006. The network entity 1002 may select at least one of the first TRP or the second TRP for a UE positioning session based on the calculated clock offset between the Tx antenna panel and the Rx antenna panel. Thus, the network entity 1002 may perform the UE positioning session based on at least one of the first TRP or the second TRP, or performing an RF sensing operation based on at least one of the first TRP or the second TRP, etc.

Figure 11:
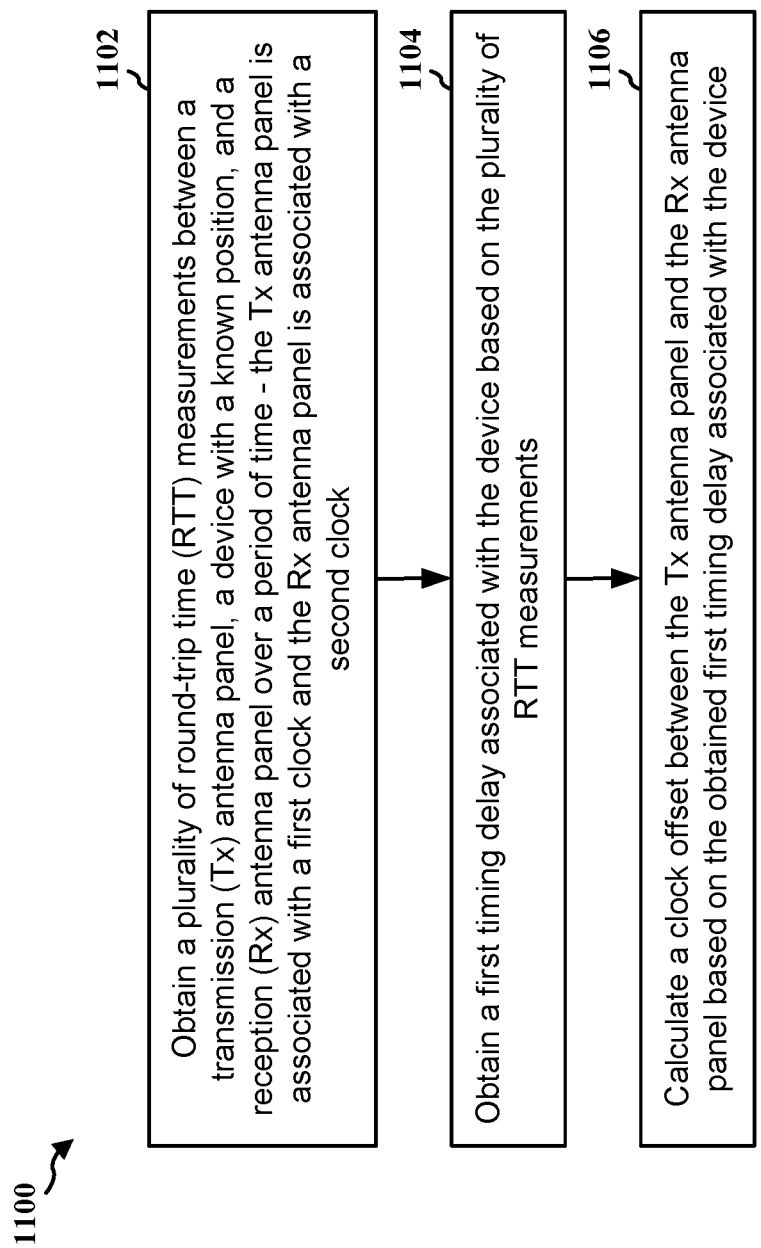
FIG. 11 is a flowchart of a method of wireless communication.

FIG. 11 is a flowchart 1100 of a method of wireless communication. The method may be performed by a network entity (e.g., the base station 102, 502; the LMF 166; the wireless device shown at 810 of FIG. 8; the network entity 1002, 1202). The method may enable a network entity to calculate (or to account for) a relative clock drift between a Tx antenna panel (for signal transmission) and an Rx antenna panel (for signal reception) that use different RF hardware/circuits (e.g., clocks).

At 1102, the network entity may obtain a plurality of RTT measurements between a Tx antenna panel, a device with a known position, and an Rx antenna panel over a period of time, where the Tx antenna panel is associated with a first clock and the Rx antenna panel is associated with a second clock, such as described in connection with FIGS. 8 and 10. For example, at 1020 of FIG. 10, the network entity 1002 may obtain a plurality of RTT measurements 1010 between the Tx antenna panel 1004, the PRU 1008 (with a known position), and the Rx antenna panel 1006 over a period of time, where the Tx antenna panel 1004 is associated with a first clock and the Rx antenna panel 1006 is associated with a second clock. The obtaining of the plurality of RTT measurements may be performed by, e.g., the Tx/Rx clock drift calculation component 199 and/or the communication interface 1218, 1238, and/or 1248 of the network entity 1202 in FIG. 12.

At 1104, the network entity may obtain a first timing delay associated with the device based on the plurality of RTT measurements, such as described in connection with FIGS. 8 and 10. For example, at 1024 of FIG. 10, the network entity 1002 may obtain a timing delay 1012 associated with the PRU 1008 based on the plurality of RTT measurements 1010. The obtaining of the first timing delay associated with the device may be performed by, e.g., the Tx/Rx clock drift calculation component 199 and/or the communication interface 1218, 1238, and/or 1248 of the network entity 1202 in FIG. 12.

At 1106, the network entity may calculate a clock offset between the Tx antenna panel and the Rx antenna panel based on the obtained first timing delay associated with the device, such as described in connection with FIGS. 8 and 10. For example, at 1026 of FIG. 10, the network entity 1002 may calculate a clock offset 1014 between the Tx antenna panel 1004 and the Rx antenna panel 1006 based on the timing delay 1012. The calculation of the clock offset between the Tx antenna panel and the Rx antenna panel may be performed by, e.g., the Tx/Rx clock drift calculation component 199 and/or the communication interface 1218, 1238, and/or 1248 of the network entity 1202 in FIG. 12.

In one example, each of the plurality of RTT measurements (Meas RTT) may be indicated by:

$$\text{Meas RTT} = T_{TX}^g + T_{TX\text{-}PRU} + T_{PRU}^g + T_{PRU\text{-}RX} + T_{RX}^g + T_{TX\text{-}RX\text{-}clkoffset},$$

$T_{TX}^g$ being a second timing delay associated with the Tx antenna panel, $T_{TX\text{-}PRU}$ being a first period of time for a signal to propagate from the Tx antenna panel to the device, $T_{PRU}^g$ being the first timing delay associated with the device, $T_{PRU\text{-}RX}$ being a second period of time for a signal to propagate from the device to the Rx antenna panel, $T_{RX}^g$ being a third timing delay associated with the Rx antenna panel, and $T_{TX\text{-}RX\text{-}clkoffset}$ being the clock offset between the Tx antenna panel and the Rx antenna panel. In another example, to obtain the first timing delay associated with the device based on the plurality of RTT measurements, the network entity may estimate the first timing delay associated with the device based on the plurality of RTT measurements, and the network entity may receive, from the device, a TRP, or a base station, an indication of the first timing delay associated with the device based on the plurality of RTT measurements. In such an example, to estimate the first timing delay associated with the device based on the plurality of RTT measurements, the network entity may obtain values for the second timing delay ($T_{TX}^g$), the first period of time ($T_{TX\text{-}PRU}$), the second period of time ($T_{PRU\text{-}RX}$), and a third timing delay ($T_{RX}^g$), and the network entity may cancel the values from the plurality of RTT measurements to obtain a combined delay ($\hat{T}_{est}$) that includes the first timing delay ($T_{PRU}^g$) and the clock offset ($T_{TX\text{-}RX\text{-}clkoffset}$): $\hat{T}_{est}$=Meas RTT$-T_{TX}^g-T_{RX}^g-T_{TX\text{-}PRU}-T_{PRU\text{-}RX}=T_{PRU}^g+T_{TX\text{-}RX\text{-}clkoffset}$ and the network entity may calculate the first timing delay ($T_{PRU}^g$) from a plurality of combined delays ($\hat{T}_{est}$) derived from the plurality RTT measurements based on the first timing delay ($T_{PRU}^g$) being a constant and an average of clock offsets ($E[T_{TX\text{-}RX\text{-}clkoffset}]$) in the plurality of combined delays being zero: $E[T_{TX\text{-}RX\text{-}clkoffset}]=0$, and $E[\hat{T}_{est}]=T_{PRU}^g$. In such an example, to calculate the clock offset ($T_{TX\text{-}RX\text{-}clkoffset}$) between the Tx antenna panel and the Rx antenna panel, the network entity may subtract the first timing delay ($T_{PRU}^g$) from the combined delay ($\hat{T}_{est}$): $T_{TX\text{-}RX\text{-}clkoffset}=\hat{T}_{est}-T_{PRU}^g$.

In another example, the Tx antenna panel may not co-locate with the Rx antenna panel. In such an example, the network entity may receive a first indication of a first location of the Tx antenna panel and a second indication of a second location of the Rx antenna panel. In such an example, at least one of the first indication or the second indication may be received from at least one TRP or a base station, where the at least one TRP or the base station is associated with at least one of the Tx antenna panel or the Rx antenna panel.

In another example, the network entity may receive a list of device candidates with known locations that are capable of determining their corresponding timing delays, and the network entity may select the device from the list of device candidates based on at least one criterion. In such an example, the at least one criterion may include the device being in a LOS condition with the Tx antenna panel and the Rx antenna panel.

In another example, to obtain the first timing delay associated with the device based on the plurality of RTT measurements, the network entity may configure the device for a measurement of the first timing delay, and the network entity may receive the first timing delay from the device.

In another example, the Tx antenna panel and the Rx antenna panel may be configured for a bi-static sensing operation.

In another example, a first TRP may be associated with both the Tx antenna panel or the Rx antenna panel, or the first TRP may be associated with the Tx antenna panel and a second TRP may be associated with the Rx antenna panel. In such an example, the network entity may select at least one of the first TRP or the second TRP for a UE positioning session based on the calculated clock offset between the Tx antenna panel and the Rx antenna panel. In such an example, the network entity may perform the UE positioning session based on at least one of the first TRP or the second TRP, or the network entity may perform a sensing operation based on at least one of the first TRP or the second TRP.

In another example, the first TRP and the second TRP may be included in a first category of TRPs that is associated with the clock offset between the Tx antenna panel and the Rx antenna panel.

In another example, the network entity may be a base station, a component of the base station, a TRP, a location server, or an LMF, and the device may be a PRU.

Figure 12:
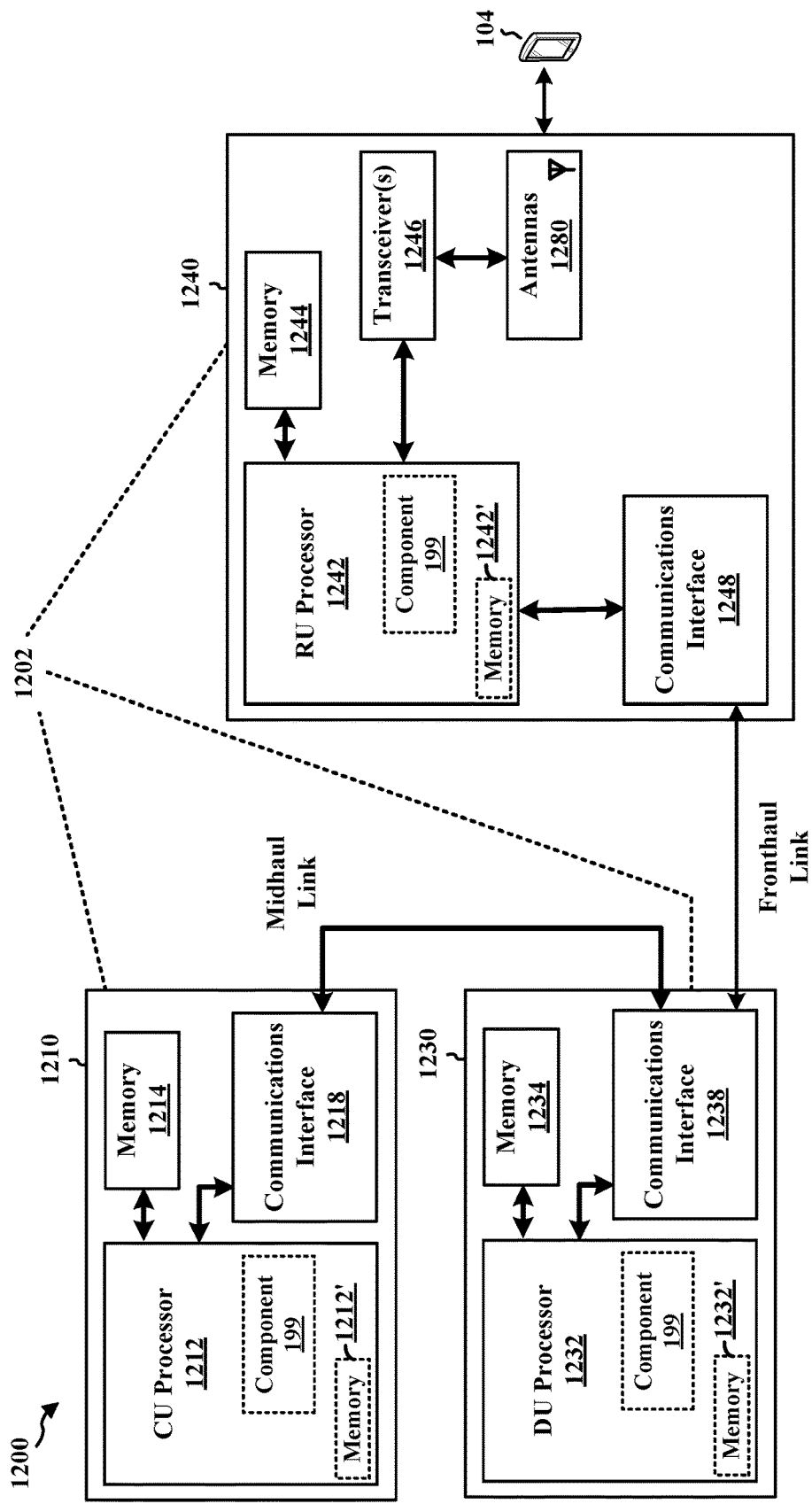
FIG. 12 is a diagram illustrating an example of a hardware implementation for a network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the Tx/Rx clock drift calculation component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communication interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communication interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communication interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the Tx/Rx clock drift calculation component 199 is configured to obtain a plurality of RTT measurements between a Tx antenna panel, a device with a known position, and an Rx antenna panel over a period of time, where the Tx antenna panel is associated with a first clock and the Rx antenna panel is associated with a second clock. The Tx/Rx clock drift calculation component 199 may also be configured to obtain a first timing delay associated with the device based on the plurality of RTT measurements. The Tx/Rx clock drift calculation component 199 may also be configured to calculate a clock offset between the Tx antenna panel and the Rx antenna panel based on the obtained first timing delay associated with the device. The Tx/Rx clock drift calculation component 199 may be within one or more processors of one or more of the CU 1210, DU 1230, and the RU 1240. The Tx/Rx clock drift calculation component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for obtaining a plurality of RTT measurements between a Tx antenna panel, a device with a known position, and an Rx antenna panel over a period of time, where the Tx antenna panel is associated with a first clock and the Rx antenna panel is associated with a second clock. The network entity 1202 may further include means for obtaining a first timing delay associated with the device based on the plurality of RTT measurements. The network entity 1202 may further include means for calculating a clock offset between the Tx antenna panel and the Rx antenna panel based on the obtained first timing delay associated with the device.

In one configuration, each of the plurality of RTT measurements (Meas RTT) may be indicated by:

$$\text{Meas RTT} = T_{TX}^g + T_{TX\text{-}PRU} + T_{PRU}^g + T_{PRU\text{-}RX} + T_{RX}^g + T_{TX\text{-}RX\text{-}clkoffset},$$

$T_{TX}^g$ being a second timing delay associated with the Tx antenna panel, $T_{TX\text{-}PRU}$ being a first period of time for a signal to propagate from the Tx antenna panel to the device, $T_{PRU}^g$ being the first timing delay associated with the device, $T_{PRU\text{-}RX}$ being a second period of time for a signal to propagate from the device to the Rx antenna panel, $T_{RX}^g$ being a third timing delay associated with the Rx antenna panel, and $T_{TX\text{-}RX\text{-}clkoffset}$ being the clock offset between the Tx antenna panel and the Rx antenna panel. In another configuration, the means for obtaining the first timing delay associated with the device based on the plurality of RTT measurements includes configuring network entity 1202 to estimate the first timing delay associated with the device based on the plurality of RTT measurements, and receive, from the device, a TRP, or a base station, an indication of the first timing delay associated with the device based on the plurality of RTT measurements. In such a configuration, to estimate the first timing delay associated with the device based on the plurality of RTT measurements, the network entity 1202 may be configured to obtain values for the second timing delay ($T_{TX}^g$), the first period of time ($T_{TX\text{-}PRU}$), the second period of time ($T_{PRU\text{-}RX}$), and a third timing delay ($T_{RX}^g$), and to cancel the values from the plurality of RTT measurements to obtain a combined delay ($\hat{T}_{est}$) that includes the first timing delay ($T_{PRU}^g$) and the clock offset $T_{TX\text{-}RX\text{-}clkoffset}$: $\hat{T}_{est}$=Meas RTT$-T_{TX}^g-T_{RX}^g-T_{TX\text{-}PRU}-T_{PRU\text{-}RX}=T_{PRU}^g+T_{TX\text{-}RX\text{-}clkoffset}$, and to calculate the first timing delay ($T_{PRU}^g$) from a plurality of combined delays ($\hat{T}_{est}$) derived from the plurality RTT measurements based on the first timing delay ($T_{PRU}^g$) being a constant and an average of clock offsets (E[$T_{TX\text{-}RX\text{-}clkoffset}$]) in the plurality of combined delays being zero: E[$T_{TX\text{-}RX\text{-}clkoffset}$]=0, and E [$\hat{T}_{est}$]=$T_{PRU}^g$. In such a configuration, to calculate the clock offset ($T_{TX\text{-}RX\text{-}clkoffset}$) between the Tx antenna panel and the Rx antenna panel, the network entity 1202 may be configured to subtract the first timing delay ($T_{PRU}^g$) from the combined delay ($\hat{T}_{est}$): $T_{TX\text{-}RX\text{-}clkoffset}=\hat{T}_{est}-T_{PRU}^g$.

In another configuration, the Tx antenna panel may not co-locate with the Rx antenna panel. In such a configuration, the network entity 1202 may further include means for receiving a first indication of a first location of the Tx antenna panel and a second indication of a second location of the Rx antenna panel. In such a configuration, at least one of the first indication or the second indication may be received from at least one TRP or a base station, where the at least one TRP or the base station is associated with at least one of the Tx antenna panel or the Rx antenna panel.

In another configuration, the network entity 1202 may further include means for receiving a list of device candidates with known locations that are capable of determining their corresponding timing delays, and means for selecting the device from the list of device candidates based on at least one criterion. In such a configuration, the at least one criterion may include the device being in a LOS condition with the Tx antenna panel and the Rx antenna panel.

In another configuration, the means for obtaining the first timing delay associated with the device based on the plurality of RTT measurements may include configuring the network entity 1202 to configure the device for a measurement of the first timing delay, and to receive the first timing delay from the device.

In another configuration, the Tx antenna panel and the Rx antenna panel may be configured for a bi-static sensing operation.

In another configuration, a first TRP may be associated with both the Tx antenna panel or the Rx antenna panel, or the first TRP may be associated with the Tx antenna panel and a second TRP may be associated with the Rx antenna panel. In such a configuration, the network entity 1202 may further include means for selecting at least one of the first TRP or the second TRP for a UE positioning session based on the calculated clock offset between the Tx antenna panel and the Rx antenna panel. In such a configuration, the network entity 1202 may further include means for performing the UE positioning session based on at least one of the first TRP or the second TRP, or means for performing a sensing operation based on at least one of the first TRP or the second TRP.

In another configuration, the first TRP and the second TRP may be included in a first category of TRPs that is associated with the clock offset between the Tx antenna panel and the Rx antenna panel.

In another configuration, the network entity may be a base station, a component of the base station, a TRP, a location server, or an LMF, and the device may be a PRU.

The means may be the Tx/Rx clock drift calculation component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented. The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network entity, including: obtaining a plurality of RTT measurements between a Tx antenna panel, a device with a known position, and an Rx antenna panel over a period of time, where the Tx antenna panel is associated with a first clock and the Rx antenna panel is associated with a second clock; obtaining a first timing delay associated with the device based on the plurality of RTT measurements; and calculating a clock offset between the Tx antenna panel and the Rx antenna panel based on the obtained first timing delay associated with the device.

Aspect 2 is the method of aspect 1, where each of the plurality of RTT measurements (Meas RTT) is indicated by: Meas $\text{RTT} = T_{TX}^g + T_{TX\text{-}PRU} + T_{PRU}^g + T_{PRU\text{-}RX} + T_{RX}^g + T_{TX\text{-}RX\text{-}clkoffset}$, $T_{TX}^g$ being a second timing delay associated with the Tx antenna panel, $T_{TX\text{-}PRU}$ being a first period of time for a signal to propagate from the Tx antenna panel to the device, $T_{PRU}^g$ being the first timing delay associated with the device, $T_{PRU\text{-}RX}$ being a second period of time for a signal to propagate from the device to the Rx antenna panel, $T_{RX}^g$ being a third timing delay associated with the Rx antenna panel, and $T_{TX\text{-}RX\text{-}clkoffset}$ being the clock offset between the Tx antenna panel and the Rx antenna panel.

Aspect 3 is the method of aspect 1 or 2, where obtaining the first timing delay associated with the device based on the plurality of RTT measurements includes: estimating the first timing delay associated with the device based on the plurality of RTT measurements; or receiving, from the device, a TRP, or a base station, an indication of the first timing delay associated with the device based on the plurality of RTT measurements.

Aspect 4 is the method of aspect 3, where estimating the first timing delay associated with the device based on the plurality of RTT measurements includes: obtaining values for the second timing delay ($T_{TX}^g$), the first period of time ($T_{TX\text{-}PRU}$), the second period of time ($T_{PRU\text{-}RX}$), and a third timing delay ($T_{RX}^g$); cancelling the values from the plurality of RTT measurements to obtain a combined delay ($\hat{T}_{est}$) that includes the first timing delay ($T_{PRU}^g$) and the clock offset ($T_{TX\text{-}RX\text{-}clkoffset}$):
$\hat{T}_{est} = \text{Meas RTT} - T_{TX}^g - T_{RX}^g - T_{TX\text{-}PRU} - T_{PRU\text{-}RX} = T_{PRU}^g + T_{TX\text{-}RX\text{-}clkoffset}$; and calculating the first timing delay ($T_{PRU}^g$) from a plurality of combined delays ($\hat{T}_{est}$) derived from the plurality RTT measurements based on the first timing delay ($T_{PRU}{}^g$) being a constant and an average of clock offsets (E[$T_{TX\text{-}RX\text{-}clkoffset}$]) in the plurality of combined delays being zero: E[$T_{TX\text{-}RX\text{-}clkoffset}$]=0, and E[$\hat{T}_{est}$]=$T_{PRU}{}^g$.

Aspect 5 is the method of aspect 4, where calculating the clock offset ($T_{TX\text{-}RX\text{-}clkoffset}$) between the Tx antenna panel and the Rx antenna panel includes: subtracting the first timing delay ($T_{PRU}{}^g$) from the combined delay ($\hat{T}_{est}$): $T_{TX\text{-}RX\text{-}clkoffset}$=$\hat{T}_{est}$−$T_{PRU}{}^g$.

Aspect 6 is the method any of aspects 1 to 5, where the Tx antenna panel is not co-located with the Rx antenna panel.

Aspect 7 is the method of aspect 6, further including: receiving a first indication of a first location of the Tx antenna panel and a second indication of a second location of the Rx antenna panel.

Aspect 8 is the method of aspect 7, where at least one of the first indication or the second indication is received from at least one TRP or a base station, where the at least one TRP or the base station is associated with at least one of the Tx antenna panel or the Rx antenna panel.

Aspect 9 is the method of any of aspects 1 to 8, further including: receiving a list of device candidates with known locations that are capable of determining their corresponding timing delays; and selecting the device from the list of device candidates based on at least one criterion.

Aspect 10 is the method of aspect 9, where the at least one criterion includes the device being in a line-of-sight (LOS) condition with the Tx antenna panel and the Rx antenna panel.

Aspect 11 is the method of any of aspects 1 to 10, where obtaining the first timing delay associated with the device based on the plurality of RTT measurements includes: configuring the device for a measurement of the first timing delay; and receiving the first timing delay from the device.

Aspect 12 is the method of any of aspects 1 to 11, where the Tx antenna panel and the Rx antenna panel are configured for a bi-static sensing operation.

Aspect 13 is the method of any of aspects 1 to 12, where a first TRP is associated with both the Tx antenna panel or the Rx antenna panel, or the first TRP is associated with the Tx antenna panel and a second TRP is associated with the Rx antenna panel.

Aspect 14 is the method of aspect 13, further including: selecting at least one of the first TRP or the second TRP for a UE positioning session based on the calculated clock offset between the Tx antenna panel and the Rx antenna panel.

Aspect 15 is the method of aspect 14, further including: performing the UE positioning session based on at least one of the first TRP or the second TRP; or performing a sensing operation based on at least one of the first TRP or the second TRP.

Aspect 16 is the method of aspect 13, where the first TRP and the second TRP are included in a first category of TRPs that is associated with the clock offset between the Tx antenna panel and the Rx antenna panel.

Aspect 17 is the method of aspect 13, where the network entity is a base station, a component of the base station, a TRP, a location server, or an LMF, and where the device is a PRU.

Aspect 18 is an apparatus for wireless communication at a network entity, including: a memory; and at least one processor coupled to the memory and, based at least in part on information stored in the memory, the at least one processor is configured to implement any of aspects 1 to 17.

Aspect 19 is the apparatus of aspect 18, further including at least one of a transceiver or an antenna coupled to the at least one processor.

Aspect 20 is an apparatus for wireless communication including means for implementing any of aspects 1 to 17.

Aspect 21 is a computer-readable medium (e.g., a non-transitory computer-readable medium) storing computer executable code, where the code when executed by a processor causes the processor to implement any of aspects 1 to 17.

What is claimed is:

1. An apparatus for wireless communication at a network entity, comprising:
   memory; and
   at least one processor coupled to the memory and, based at least in part on information stored in the memory, the at least one processor is configured to:
   obtain a plurality of round-trip time (RTT) measurements between a transmission (Tx) antenna panel, a device with a known position, and a reception (Rx) antenna panel over a period of time, wherein the Tx antenna panel is associated with a first clock and the Rx antenna panel is associated with a second clock;
   obtain a first timing delay associated with the device based on the plurality of RTT measurements; and
   calculate a clock offset between the Tx antenna panel and the Rx antenna panel based on the obtained first timing delay associated with the device.

2. The apparatus of claim 1, wherein each of the plurality of RTT measurements (Meas RTT) is indicated by:

$$\text{Meas RTT}=T_{TX}{}^g+T_{TX\text{-}PRU}+T_{PRU}{}^g+T_{PRU\text{-}RX}+T_{RX}{}^g+T_{TX\text{-}RX\text{-}clkoffset},$$

$T_{TX}{}^g$ being a second timing delay associated with the Tx antenna panel, $T_{TX\text{-}PRU}$ being a first period of time for a signal to propagate from the Tx antenna panel to the device, $T_{PRU}{}^g$ being the first timing delay associated with the device, $T_{PRU\text{-}RX}$ being a second period of time for a signal to propagate from the device to the Rx antenna panel, $T_{RX}{}^g$ being a third timing delay associated with the Rx antenna panel, and $T_{TX\text{-}RX\text{-}clkoffset}$ being the clock offset between the Tx antenna panel and the Rx antenna panel.

3. The apparatus of claim 1, wherein to obtain the first timing delay associated with the device based on the plurality of RTT measurements, the at least one processor is configured to:
   estimate the first timing delay associated with the device based on the plurality of RTT measurements; or
   receive, from the device, a transmission reception point (TRP), or a base station, an indication of the first timing delay associated with the device based on the plurality of RTT measurements.

4. The apparatus of claim 3, wherein to estimate the first timing delay associated with the device based on the plurality of RTT measurements, the at least one processor is configured to:
   obtain values for the second timing delay ($T_{TX}{}^g$), the first period of time ($T_{TX\text{-}PRU}$), the second period of time ($T_{PRU\text{-}RX}$), and a third timing delay ($T_{RX}{}^g$);
   cancel the values from the plurality of RTT measurements to obtain a combined delay ($\hat{T}_{est}$) that includes the first timing delay ($T_{PRU}{}^g$) and the clock offset ($T_{TX\text{-}RX\text{-}clkoffset}$):

$$\hat{T}_{est}=\text{Meas RTT}-T_{TX}{}^g-T_{RX}{}^g-T_{TX\text{-}PRU}-T_{PRU\text{-}RX}=T_{PRU}{}^g+T_{TX\text{-}RX\text{-}clkoffset};\text{ and}$$

calculate the first timing delay ($T_{PRU}{}^g$) from a plurality of combined delays ($\hat{T}_{est}$) derived from the plurality RTT measurements based on the first timing delay ($T_{PRU}{}^g$)

being a constant and an average of clock offsets ($E[T_{TX\text{-}RX\text{-}clkoffset}]$) in the plurality of combined delays being zero: $E[T_{TX\text{-}RX\text{-}clkoffset}]=0$, and $E[\hat{T}_{est}]=T_{PRU}{}^g$.

5. The apparatus of claim 4, wherein to calculate the clock offset ($T_{TX\text{-}RX\text{-}clkoffset}$) between the Tx antenna panel and the Rx antenna panel, the at least one processor is configured to:
  subtract the first timing delay ($T_{PRU}{}^g$) from the combined delay ($\hat{T}_{est}$): $T_{TX\text{-}RX\text{-}clkoffset}=\hat{T}_{est}-T_{PRU}{}^g$.

6. The apparatus of claim 1, wherein the Tx antenna panel is not co-located with the Rx antenna panel.

7. The apparatus of claim 6, wherein the at least one processor is further configured to:
  receive a first indication of a first location of the Tx antenna panel and a second indication of a second location of the Rx antenna panel.

8. The apparatus of claim 7, wherein at least one of the first indication or the second indication is configured to be received from at least one transmission reception point (TRP) or a base station, wherein the at least one TRP or the base station is associated with at least one of the Tx antenna panel or the Rx antenna panel.

9. The apparatus of claim 1, wherein the at least one processor is further configured to:
  receive a list of device candidates with known locations that are capable of determining their corresponding timing delays; and
  select the device from the list of device candidates based on at least one criterion.

10. The apparatus of claim 9, wherein the at least one criterion includes the device being in a line-of-sight (LOS) condition with the Tx antenna panel and the Rx antenna panel.

11. The apparatus of claim 1, wherein to obtain the first timing delay associated with the device based on the plurality of RTT measurements, the at least one processor is configured to:
  configure the device for a measurement of the first timing delay; and
  receive the first timing delay from the device.

12. The apparatus of claim 1, wherein the Tx antenna panel and the Rx antenna panel are configured for a bi-static sensing operation.

13. The apparatus of claim 1, wherein a first transmission reception point (TRP) is associated with both the Tx antenna panel or the Rx antenna panel, or the first TRP is associated with the Tx antenna panel and a second TRP is associated with the Rx antenna panel.

14. The apparatus of claim 13, wherein the at least one processor is further configured to:
  select at least one of the first TRP or the second TRP for a user equipment (UE) positioning session based on the calculated clock offset between the Tx antenna panel and the Rx antenna panel.

15. The apparatus of claim 14, wherein the at least one processor is further configured to:
  perform the UE positioning session based on at least one of the first TRP or the second TRP; or
  perform a sensing operation based on at least one of the first TRP or the second TRP.

16. The apparatus of claim 13, wherein the first TRP and the second TRP are included in a first category of TRPs that is associated with the clock offset between the Tx antenna panel and the Rx antenna panel.

17. The apparatus of claim 1, wherein the network entity is a base station, a component of the base station, a transmission reception point (TRP), a location server, or a location management function (LMF), and wherein the device is a positioning reference unit (PRU), further comprising at least one of a transceiver or an antenna coupled to the at least one processor, wherein to obtain the plurality of RTT measurements between the Tx antenna panel, the at least one processor is configured to obtain, via at least one of the transceiver or the antenna, the plurality of RTT measurements between the Tx antenna panel.

18. A method of wireless communication at a network entity comprising:
  obtaining a plurality of round-trip time (RTT) measurements between a transmission (Tx) antenna panel, a device with a known position, and a reception (Rx) antenna panel over a period of time, wherein the Tx antenna panel is associated with a first clock and the Rx antenna panel is associated with a second clock;
  obtaining a first timing delay associated with the device based on the plurality of RTT measurements; and
  calculating a clock offset between the Tx antenna panel and the Rx antenna panel based on the obtained first timing delay associated with the device.

19. The method of claim 18, wherein the Tx antenna panel is not co-located with the Rx antenna panel.

20. The method of claim 19, further comprising:
  receiving a first indication of a first location of the Tx antenna panel and a second indication of a second location of the Rx antenna panel.

21. The method of claim 20, wherein at least one of the first indication or the second indication is received from at least one transmission reception point (TRP) or a base station, wherein the at least one TRP or the base station is associated with at least one of the Tx antenna panel or the Rx antenna panel.

22. The method of claim 18, further comprising:
  receiving a list of device candidates with known locations that are capable of determining their corresponding timing delays; and
  selecting the device from the list of device candidates based on at least one criterion.

23. The method of claim 22, wherein the at least one criterion includes the device being in a line-of-sight (LOS) condition with the Tx antenna panel and the Rx antenna panel.

24. The method of claim 18, wherein obtaining the first timing delay associated with the device based on the plurality of RTT measurements comprises:
  configuring the device for a measurement of the first timing delay; and
  receiving the first timing delay from the device.

25. The method of claim 18, wherein the Tx antenna panel and the Rx antenna panel are configured for a bi-static sensing operation.

26. The method of claim 18, wherein a first transmission reception point (TRP) is associated with both the Tx antenna panel or the Rx antenna panel, or the first TRP is associated with the Tx antenna panel and a second TRP is associated with the Rx antenna panel.

27. The method of claim 26, further comprising:
  selecting at least one of the first TRP or the second TRP for a user equipment (UE) positioning session based on the calculated clock offset between the Tx antenna panel and the Rx antenna panel.

28. The method of claim 27, further comprising:
  performing the UE positioning session based on at least one of the first TRP or the second TRP; or
  performing a sensing operation based on at least one of the first TRP or the second TRP.

29. An apparatus for wireless communication at a network entity, comprising:
- means for obtaining a plurality of round-trip time (RTT) measurements between a transmission (Tx) antenna panel, a device with a known position, and a reception (Rx) antenna panel over a period of time, wherein the Tx antenna panel is associated with a first clock and the Rx antenna panel is associated with a second clock;
- means for obtaining a first timing delay associated with the device based on the plurality of RTT measurements; and
- means for calculating a clock offset between the Tx antenna panel and the Rx antenna panel based on the obtained first timing delay associated with the device.

30. A non-transitory computer-readable medium storing computer executable code at a network entity, the code when executed by a processor causes the processor to:
- obtain a plurality of round-trip time (RTT) measurements between a transmission (Tx) antenna panel, a device with a known position, and a reception (Rx) antenna panel over a period of time, wherein the Tx antenna panel is associated with a first clock and the Rx antenna panel is associated with a second clock;
- obtain a first timing delay associated with the device based on the plurality of RTT measurements; and
- calculate a clock offset between the Tx antenna panel and the Rx antenna panel based on the obtained first timing delay associated with the device.

* * * * *